(12) United States Patent
Kawamura

(10) Patent No.: US 9,030,757 B2
(45) Date of Patent: May 12, 2015

(54) IMAGING LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/271,969

(22) Filed: May 7, 2014

(65) Prior Publication Data

US 2014/0240851 A1    Aug. 28, 2014

Related U.S. Application Data

(63) Continuation of application No. PCT/JP2012/007123, filed on Nov. 7, 2012.

(30) Foreign Application Priority Data

Nov. 9, 2011    (JP) .................................. 2011-245310

(51) Int. Cl.
*G02B 13/18* (2006.01)
*G02B 13/04* (2006.01)
*G02B 9/64* (2006.01)

(52) U.S. Cl.
CPC .............. *G02B 13/18* (2013.01); *G02B 13/04* (2013.01); *G02B 9/64* (2013.01)

(58) Field of Classification Search
CPC ........... G02B 13/18; G02B 13/04; G02B 9/64
See application file for complete search history.

(56) References Cited

U.S. PATENT DOCUMENTS

| 4,934,795 A | 6/1990 | Estelle |
| 5,442,485 A | 8/1995 | Yamanashi |
| 5,619,380 A | 4/1997 | Ogasawara |

(Continued)

FOREIGN PATENT DOCUMENTS

| JP | H1-222212 A | 9/1989 |
| JP | H6-67090 A | 3/1994 |

(Continued)

OTHER PUBLICATIONS

NPL Machine Translation of International Preliminary Report on Patentability Chapter II (IB/373) prepared for PCT/JP2012/007123 on May 9, 2014.*

(Continued)

*Primary Examiner* — David N Spector

(74) *Attorney, Agent, or Firm* — Young & Thompson

(57) ABSTRACT

An imaging lens includes: a first lens group; an aperture stop; and a second lens group having a positive refractive power, in this order from an object side. The first lens group includes a negative first lens provided most toward the object side. The second lens group includes a positive lens, provided most toward an imaging surface, and a negative lens having a concave surface and an aspherical surface at least toward the object side. The following Conditional Formula are satisfied:

$$0.03 < (|Sagsp1| - |Sagas1|)/Re1 < 0.35; \text{ and}$$

$$1.819 \leq NdAB$$

wherein Sagsp1 is the sag of a reference spherical surface at the edge of the effective diameter of the object side surface of the negative lens, Sagas1 is the sag of the aspherical surface of the lens, Re1 is the effective diameter of the object side surface of the lens, and NdAB is the average refractive index of the positive lens and the negative lens.

20 Claims, 10 Drawing Sheets

EXAMPLE 1

(56) References Cited

U.S. PATENT DOCUMENTS

| | | | |
|---|---|---|---|
| 6,853,495 B2 * | 2/2005 | Kondo et al. | 359/680 |
| 7,535,652 B2 | 5/2009 | Ichikawa | |
| 8,472,125 B2 | 6/2013 | Fukuta | |
| 8,503,110 B2 | 8/2013 | Oshita | |
| 8,654,458 B2 * | 2/2014 | Tsai et al. | 359/770 |
| 8,873,167 B2 * | 10/2014 | Ning | 359/740 |
| 8,964,312 B2 * | 2/2015 | Kawamura | 359/793 |
| 2007/0121215 A1 | 5/2007 | Sekita | |
| 2008/0117525 A1 | 5/2008 | Ichikawa et al. | |
| 2008/0117526 A1 | 5/2008 | Ichikawa | |
| 2009/0195888 A1 | 8/2009 | Mihara et al. | |
| 2010/0265380 A1 | 10/2010 | Fukuta | |
| 2011/0102625 A1 | 5/2011 | Mihara et al. | |

FOREIGN PATENT DOCUMENTS

| | | |
|---|---|---|
| JP | 06-160706 | 6/1994 |
| JP | H6-194574 A | 7/1994 |
| JP | 10-333038 A | 12/1998 |
| JP | 2002-072091 | 3/2002 |
| JP | 2002-098893 A | 4/2002 |
| JP | 2004-271937 A | 9/2004 |
| JP | 2005-352428 A | 12/2005 |
| JP | 2007-108712 | 4/2007 |
| JP | 2007-155836 A | 6/2007 |
| JP | 2008-040033 | 2/2008 |
| JP | 2008-129456 A | 6/2008 |
| JP | 2008-129457 | 6/2008 |
| JP | 2009-258157 | 11/2009 |
| JP | 2011-059288 | 3/2011 |
| JP | 2011-059599 | 3/2011 |
| WO | 2009063766 A1 | 5/2009 |

OTHER PUBLICATIONS

NPL Machine Translation of PCT/JP2012/007123 as originally filed on Nov. 7, 2012.*

International Search Report, PCT/JP2012/007123, Mar. 12, 2013.

Japanese Office Action dated Jun. 24, 2014; Japanese Application No. 2013-542840.

* cited by examiner

EXAMPLE 1

EXAMPLE 2

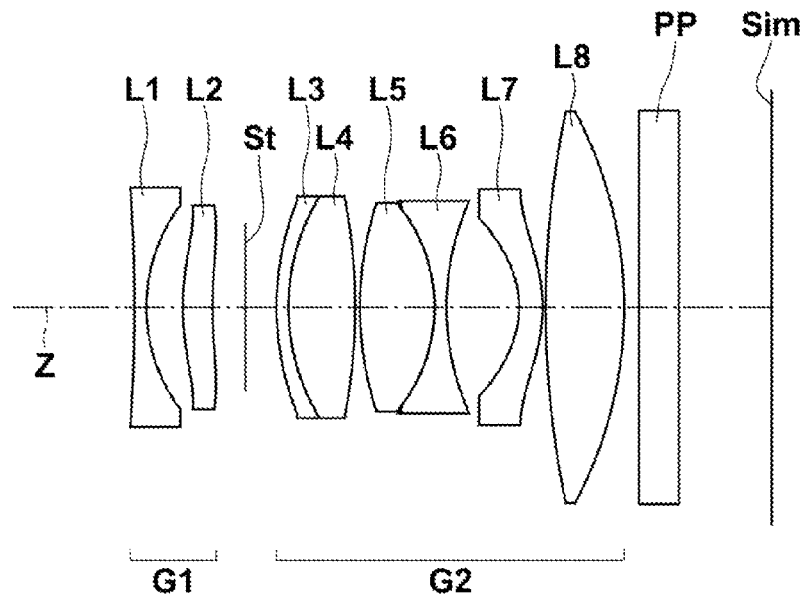
FIG.3  EXAMPLE 3
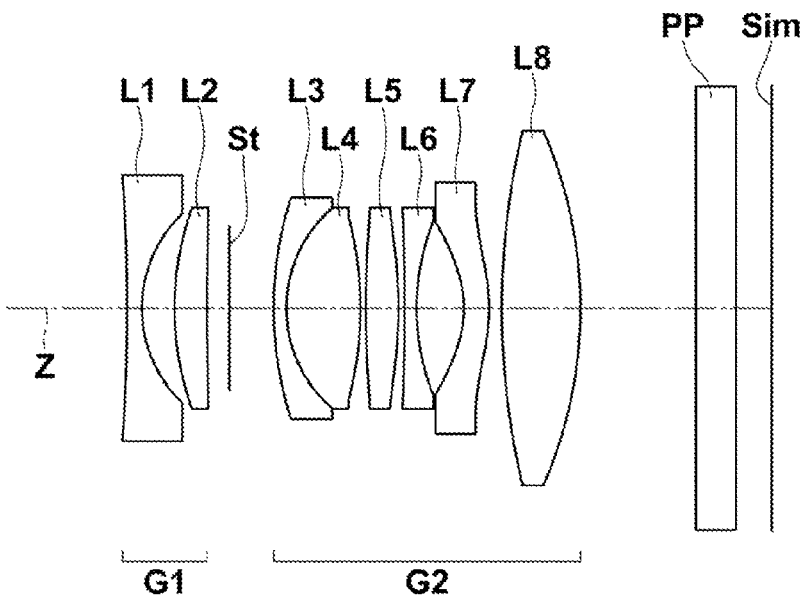
FIG.4  EXAMPLE 4

FIG.5  EXAMPLE 5
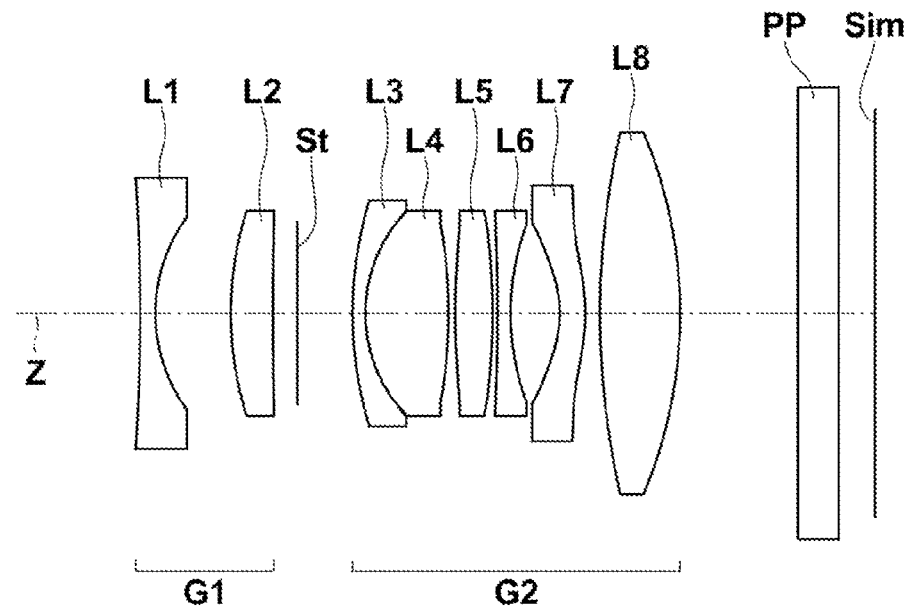
FIG.6  REFERENCE EXAMPLE 6
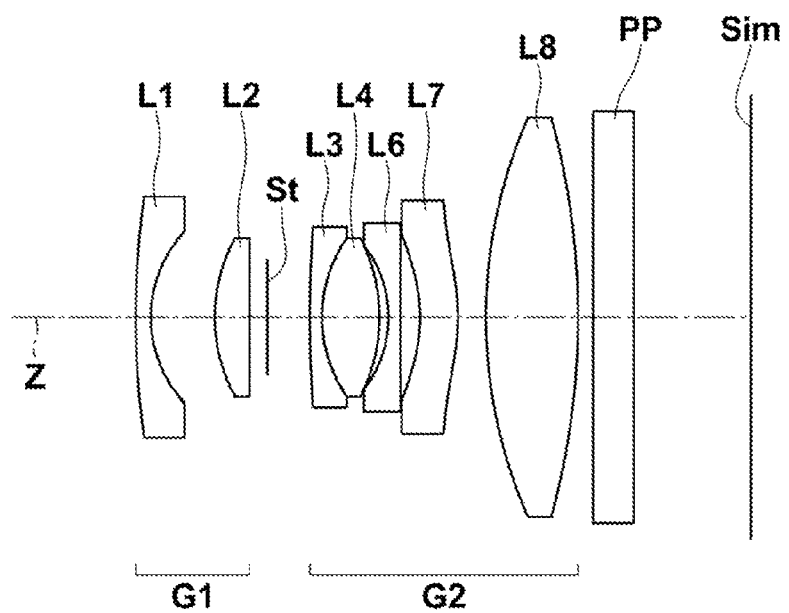

FIG.7  REFERENCE EXAMPLE 7
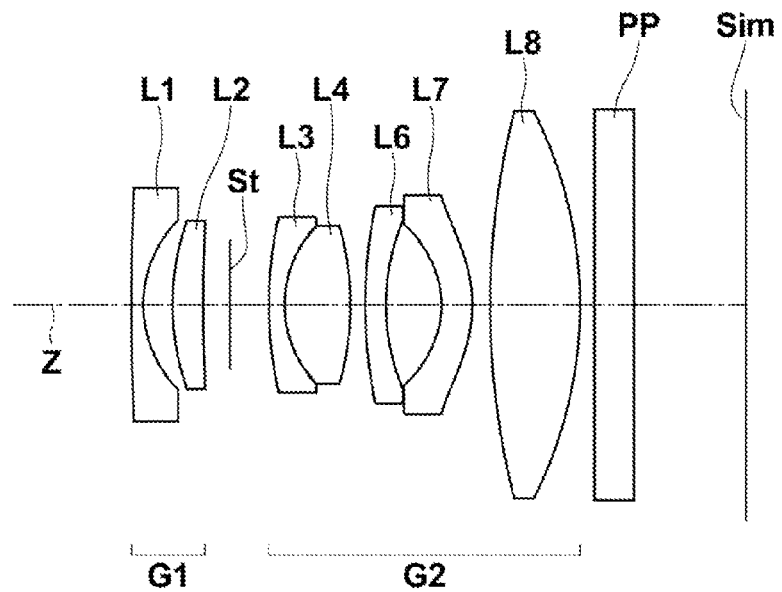
FIG.8  REFERENCE EXAMPLE 8
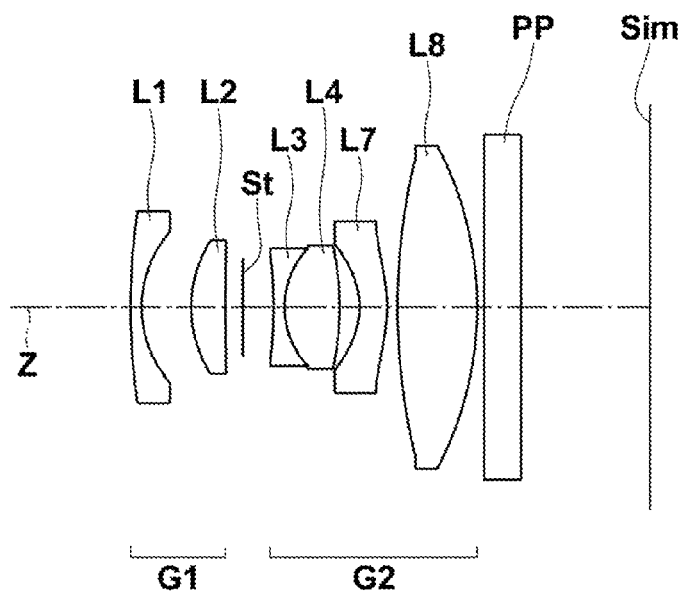

IMAGING LENS AND IMAGING APPARATUS

TECHNICAL FIELD

The present invention is related to an imaging lens, and particularly to a compact, wide angle lens suitable for imaging apparatuses such as electronic cameras.

The present invention is also related to an imaging apparatus equipped with such an imaging lens.

DESCRIPTION OF THE RELATED ART

In recent years, there are many digital cameras equipped with large imaging devices that comply with the APS format or the four thirds format, for example, are commercially available. Recently, such cameras are not limited to digital single lens reflex cameras, and exchangeable lens digital cameras without reflex finders and compact cameras also employ the aforementioned large imaging devices. The advantages of these cameras are that they are compact as a whole and are highly portable, while enabling imaging at high quality. Accompanying the development of such cameras, there is demand for compact lens systems. Examples of wide angle lenses which are compatible with these large imaging devices include those disclosed in Japanese Unexamined Patent Publication Nos. 6(1994)-160706, 2008-040033, 2011-059288, and 2009-258157.

Conventionally, retro focus type lenses constituted by a front group having a negative refractive power and a rear group having a positive refractive power are known as wide angle lenses to be mounted on digital cameras and video cameras. In wide angle lenses which are mounted on digital cameras, it is necessary to secure a wide angle of view, while an amount of back focus sufficient to insert various filters and optical members is also required. Therefore, the aforementioned retro focus type of lens, which is capable of obtaining a long back focus with respect to focal length, had been widely employed.

However, it is recognized that there is a problem in retro focus type imaging lenses in that the total lengths thereof tend to become long. Therefore, various imaging lenses capable of being configured to be compact have been proposed. Japanese Unexamined Patent Publication Nos. 2011-059288 and 2009-258157 disclose imaging lenses which are designed to be compact.

DISCLOSURE OF THE INVENTION

The imaging lenses disclosed in Japanese Unexamined Patent Publication Nos. 2011-059288 and 2009-258157 are designed to be compact by being constituted by a small number of lenses. However, these imaging lenses have angles of view of approximately 60°, which is not a sufficiently wide angle of view. In addition, the lens groups in front of and to the rear of an aperture stop are not symmetrical in a retro focus type imaging lens which has a leading negative lens group, resulting in correction of aberrations becoming difficult. A negative power at the front end is necessary in order to obtain a large amount of back focus. However, such a configuration increases field curvature and the Petzval sum in the negative direction. Therefore, it is extremely difficult to obtain favorable image quality through peripheral portions in the case that an imaging lens is configured to be compact.

The present invention has been developed in view of the foregoing circumstances. It is an object of the present invention to provide an imaging lens having a level of optical performance which is compatible with large imaging devices, capable of being configured to be compact and capable of securing a wide angle of view.

It is another object of the present invention to provide an imaging apparatus equipped with such an imaging lens, which is capable of being configured to be compact and capable of imaging with a wide angle of view and high image quality.

An imaging lens of the present invention substantially consists of:

a first lens group having a negative or a positive refractive power;

an aperture stop; and a second lens group having a positive refractive power, provided in this order from an object side;

the first lens group at least including a negative lens provided most toward the object side;

the second lens group including a lens A having a positive refractive power, provided most toward the side of an imaging surface, and a lens B having a negative refractive power, an aspherical lens surface at least toward the object side, and a concave surface toward the object side, provided adjacent to and toward the object side of the lens A;

the imaging lens satisfying Conditional Formulae (1) and (2) below:

$$0.03 < (|Sagsp1| - |Sagas1|)/Re1 < 0.35 \quad (1)$$

$$1.819 \leq NdAB \quad (2)$$

wherein Sagsp1 is the amount of sag of a reference spherical surface at the edge of the effective diameter of the surface of the lens B toward the object side, Sagas1 is the amount of sag of the aspherical surface of the lens B, Re1 is the effective diameter of the lens surface of the lens B toward the object side, and NdAB is the average refractive index of the lens A and the lens B.

Note that the above expression "substantially consists of . . . " includes cases in which the imaging lens includes lenses that practically have not power, optical elements other than lenses such as a cover glass, and mechanical portions such as lens flanges, a lens barrel, an imaging device, and a blur correcting mechanism, in addition to the lens groups listed above as constituent elements. This applies to expressions "substantially consists of . . . " that appear in the following description as well.

In addition, the expression "at the edge of the effective diameter" refers to positions 10 mm from the optical axis, in the case that the effective diameter is 10 mm.

In addition, the shapes of the surfaces of the lenses and the signs of the refractive powers thereof are considered in the paraxial regions for aspherical surfaces, if lenses having aspherical surfaces are included.

Note that it is particularly desirable for the imaging lens of the present invention to satisfy the conditional formula below within the range defined in Conditional Formula (1):

$$0.04 < (|Sagsp1| - |Sagas1|)/Re1 < 0.32 \quad (1').$$

In addition, it is desirable for the lens B provided within the second lens group to be of a meniscus shape having a concave surface toward the object side.

In the imaging lens of the present invention, it is desirable for the lens surface toward an image side of the lens B provided in the second lens group to be an aspherical surface; and for the imaging lens to satisfy the following conditional formula:

$$0.06 < (|Sagsp2| - |Sagas2|)/Re2 < 0.30 \quad (3)$$

wherein Sagsp2 is the amount of sag of a reference spherical surface at the edge of the effective diameter of the surface of the lens B toward the image side, Sagas2 is the amount of sag of the aspherical surface of the lens B, and Re2 is the effective diameter of the lens surface of the lens B toward the image side.

Further, it is particularly desirable for the imaging lens of the present invention to satisfy the following conditional formula within the range defined by Conditional Formula (3):

$$0.09<(|Sagsp2|-|Sagas2|)/Re2<0.28 \qquad (3').$$

In the imaging lens of the present invention, it is desirable for at least one pair of cemented lenses to be provided more toward the object side than the lens B.

In the imaging lens of the present invention, it is desirable for a lens having a positive refractive power and at least one aspherical surface to be provided more toward the object side than the lens B.

In the imaging lens of the present invention, it is desirable for the second lens group to substantially consist of a cemented lens, a positive lens, a negative lens, the lens B, and the lens A, provided in this order from the object side.

Alternatively, the second lens group may substantially consist of two pairs of cemented lenses, the lens B, and the lens A, provided in this order from the object side.

As a further alternative, the second lens group may substantially consist of a cemented lens, a negative lens, the lens B, and the lens A, provided in this order from the object side.

Further, the second lens group may substantially consist of a cemented lens, the lens B, and the lens A, provided in this order from the object side.

It is desirable for the imaging lens of the present invention to satisfy the following conditional formula:

$$0.8<fA/f<1.7 \qquad (4)$$

wherein fA is the focal length of the lens A, and f is the focal length of the entire lens system.

Further, it is particularly desirable for the imaging lens of the present invention to satisfy the conditional formula below within the range defined in Conditional Formula (4):

$$0.9<fA/f<1.6 \qquad (4').$$

It is desirable for the imaging lens of the present invention to satisfy the following conditional formula:

$$0.6<|fB|/f<3.4 \qquad (5)$$

wherein fB is the focal length of the lens B, and f is the focal length of the entire lens system.

Further, it is particularly desirable for the imaging lens of the present invention to satisfy the conditional formula below within the range defined in Conditional Formula (5):

$$0.7<|fB|/f<3.3 \qquad (5').$$

It is desirable for the imaging lens of the present invention to satisfy the following conditional formula:

$$2.2<TL/Y<4.0 \qquad (6)$$

wherein TL is the distance along an optical axis from the lens surface most toward the object side within the first lens group to the imaging surface (back focus is an air converted length), and Y is a maximum image height, when focused on an object at infinity.

Further, it is particularly desirable for the imaging lens of the present invention to satisfy the conditional formula below within the range defined in Conditional Formula (6):

$$2.3<TL/Y<3.8 \qquad (6').$$

It is desirable for the imaging lens of the present invention to satisfy the following conditional formula:

$$1.1<TL/\Sigma d<1.7 \qquad (7)$$

wherein $\Sigma d$ is the distance along the optical axis from the lens surface most toward the object side within the first lens group to the lens surface most toward the image side in the second lens group, and TL is the distance along an optical axis from the lens surface most toward the object side within the first lens group to the imaging surface (back focus is an air converted length), when focused on an object at infinity.

Further, it is particularly desirable for the imaging lens of the present invention to satisfy the conditional formula below within the range defined in Conditional Formula (7):

$$1.2<TL/\Sigma d<1.6 \qquad (7').$$

Meanwhile, an imaging apparatus of the present invention is equipped with the imaging lens of the present invention.

As described above, the imaging lens of the present invention is provided with a negative lens most toward the object side, and therefore can achieve a wide angle of view. In addition, the imaging lens of the present invention is provided with the lens B, which is an aspherical lens having a negative refractive power, within the second lens group. Therefore, spherical aberration and field curvature can be corrected with favorable balance, and further, sufficient miniaturization also becomes possible.

Further, the imaging lens of the present invention satisfies Conditional Formulae (1) and (2), and therefore exhibits the following advantageous effect. That is, Conditional Formula (1) defines the relationship between the difference between the amount of sag of the aspherical surface toward the object side of the lens B and the amount of sag of a reference spherical surface, and the effective radius of the lens B. If the value of (|Sagsp1|−|Sagas1|)/Re1 is outside the range defined in Conditional Formula (1), aberrations such as spherical aberration, field curvature, and lateral chromatic aberration cannot be corrected with favorable balance, which is not preferable. The above shortcoming can be prevented if Conditional Formula (1) is satisfied, and various aberrations can be favorably corrected.

The above advantageous effect will become more prominent, particularly if Conditional Formula (1') is satisfied within the range defined in Conditional Formula (1).

Meanwhile, Conditional Formula (2) defines the average value of the refractive indices of the lens A and the lens B. If the value of NdAB is less than the lower limit defined in Conditional Formula (2), control of the Petzval sum will become difficult, resulting in correction of field curvature becoming difficult, which is not preferable. The above shortcoming can be prevented if Conditional Formula (2) is satisfied, and it will be possible to favorably correct field curvature.

The imaging lens of the present invention may adopt a configuration, wherein the lens B provided within the second lens group is of a meniscus shape having a concave surface toward the object side. In this case, the occurrence of distortion and comatic aberration can be reduced.

The following advantageous effect can be obtained, in the case that the imaging lens of the present invention satisfies Conditional Formula (3). That is, Conditional Formula (3) defines the relationship between the difference between the amount of sag of the aspherical surface toward the image side of the lens B and the amount of sag of a reference spherical surface, and the effective radius of the lens B. If the value of (|Sagsp2|−|Sagas2|)/Re2 is outside the range defined in Conditional Formula (3), aberrations such as spherical aberration, field curvature, and lateral chromatic aberration cannot be corrected with favorable balance, which is not preferable. The above shortcoming can be prevented if Conditional Formula (3) is satisfied, and various aberrations can be favorably corrected.

The above advantageous effect will become more prominent, particularly if Conditional Formula (3') is satisfied within the range defined in Conditional Formula (3).

The imaging lens of the present invention may adopt a configuration, wherein at least one pair of cemented lenses is provided more toward the object side than the lens B. In this case, the operation of the cemented lens enables longitudinal chromatic aberration and lateral chromatic aberration to be corrected with favorable balance, even in the case that the diameters of the lenses are increased or the angle of view is widened.

The imaging lens of the present invention may adopt a configuration, wherein a lens having a positive refractive power and at least one aspherical surface is provided more toward the object side than the lens B. In this case, spherical aberration can be favorably corrected.

The imaging lens of the present invention may adopt a configuration, wherein the second lens group substantially consists of a cemented lens, a positive lens, a negative lens, the lens B, and the lens A, provided in this order from the object side. In this case, it becomes possible to correct various aberrations with favorable balance from the optical axis through the peripheral portions of the lenses.

The imaging lens of the present invention may adopt a configuration, wherein the second lens group substantially consists of two pairs of cemented lenses, the lens B, and the lens A, provided in this order from the object side. Such a configuration is advantageous from the viewpoint of correcting chromatic aberrations, because two pairs of cemented lenses are provided.

The imaging lens of the present invention may adopt a configuration, wherein the second lens group substantially consists of a cemented lens, a negative lens, the lens B, and the lens A, provided in this order from the object side. Such a configuration is advantageous from the viewpoint of miniaturization, because the number of lenses is decreased.

The imaging lens of the present invention may adopt a configuration, wherein the second lens group substantially consists of a cemented lens, the lens B, and the lens A, provided in this order from the object side. Such a configuration is even more advantageous from the viewpoint of miniaturization, because there is a smaller number of lenses.

The following advantageous effects can be obtained, in the case that the imaging lens of the present invention satisfies Conditional Formula (4). That is, Conditional Formula (4) defines the relationship between the focal length of the lens A and the focal length of the entire system. If the value of fA/f is greater than the upper limit defined in Conditional Formula (4), comatic aberration may increase, and further, the exit pupil position will become more toward the imaging surface, resulting in a loss of telecentric properties, which is not preferable. Inversely, if the value of fA/f is less than the lower limit defined in Conditional Formula (4), correction of field curvature will become difficult, which is not preferable. The above shortcomings can be prevented if Conditional Formula (4) is satisfies. That is, the occurrence of comatic aberration can be suppressed, telecentric properties can be secured, and further, favorable correction of field curvature will become possible.

The above advantageous effect will become more prominent, particularly if Conditional Formula (4') is satisfied within the range defined in Conditional Formula (4).

In addition, the following advantageous effects can be obtained, in the case that the imaging lens of the present invention satisfies Conditional Formula (5). That is, Conditional Formula (5) defines the relationship between the focal length of the lens B and the focal length of the entire system. If the value of |fB|/f is less than the lower limit defined in Conditional Formula (5) and the power of the lens B becomes excessively strong, correction of off axis aberrations which are generated in the second lens group will become difficult, which is not preferable. Inversely, if the value of |fB|/f is greater than the upper limit defined in Conditional Formula (5), it will become difficult to maintain the balance between spherical aberration and field curvature while suppressing distortion, which is not preferable. The above shortcomings can be prevented if Conditional Formula (5) is satisfied. That is, off axis aberrations can be favorably corrected, and the balance between spherical aberration and field curvature can be maintained while suppressing distortion.

The above advantageous effects will become more prominent, particularly if Conditional Formula (5') is satisfied within the range defined in Conditional Formula (5).

In addition, the following advantageous effects can be obtained, in the case that the imaging lens of the present invention satisfies Conditional Formula (6). That is, Conditional Formula (6) defines the relationship between the total length of the optical system and the maximum image height. If the value of TL/Y is greater than the upper limit defined in Conditional Formula (6) it will be advantageous from the viewpoint of correcting aberrations. However, the size of the lens system as a whole will become large, which is not preferable from the viewpoint of miniaturization. Inversely, if the value of TL/Y is less than the lower limit defined in Conditional Formula (6), correction of spherical aberration and field curvature will become difficult in the lens system as a whole, which is not preferable. The above shortcomings can be prevented if Conditional Formula (6) is satisfied. That is, various aberrations can be favorably corrected, and miniaturization becomes possible.

The above advantageous effects will become more prominent, particularly if Conditional Formula (6') is satisfied within the range defined in Conditional Formula (6).

In addition, the following advantageous effects can be obtained, in the case that the imaging lens of the present invention satisfies Conditional Formula (7). That is, Conditional Formula (7) defines the relationship between the distance along the optical axis from the lens surface most toward the object side within the first lens group to the lens surface most toward the image side in the second lens group and the distance along the optical axis from the lens surface most toward the object side within the first lens group to the imaging surface. If the value of TL/$\Sigma$d is greater than the upper limit defined in Conditional Formula (7), the lens system as a whole becomes large, and realizing both miniaturization and high performance will become difficult. Inversely, if the value of TL/$\Sigma$d is less than the lower limit defined in Conditional Formula (7), it will become difficult to correct spherical aberration and field curvature in a balanced manner, and further, it will become difficult to secure a necessary amount of back focus. The above shortcomings can be prevented if Conditional Formula (7) is satisfied. That is, both miniaturization and high performance can be realized, spherical aberration and field curvature can be corrected in a balanced manner, and securing a desired amount of back focus will be facilitated.

The above advantageous effects will become more prominent in the case that Conditional Formula (7') is satisfied within the range defined in Conditional Formula (7)

Meanwhile, an imaging apparatus of the present invention is equipped with the imaging lens of the present invention that exhibits the advantageous effects described above. Therefore, the imaging apparatus of the present invention can perform imaging at a wide angle of view and achieve a reduction in size.

BRIEF DESCRIPTION OF THE DRAWINGS

FIG. 3 is a sectional diagram that illustrates the lens configuration of an imaging lens according to Example 3 of the present invention.

FIG. 4 is a sectional diagram that illustrates the lens configuration of an imaging lens according to Example 4 of the present invention.

FIG. 5 is a sectional diagram that illustrates the lens configuration of an imaging lens according to Example 5 of the present invention.

FIG. 6 is a sectional diagram that illustrates the lens configuration of an imaging lens according to Reference Example 6 with respect to the present invention.

FIG. 7 is a sectional diagram that illustrates the lens configuration of an imaging lens according to Reference Example 7 with respect to the present invention.

FIG. 8 is a sectional diagram that illustrates the lens configuration of an imaging lens according to Reference Example 8 with respect to the present invention.

Figure 9:
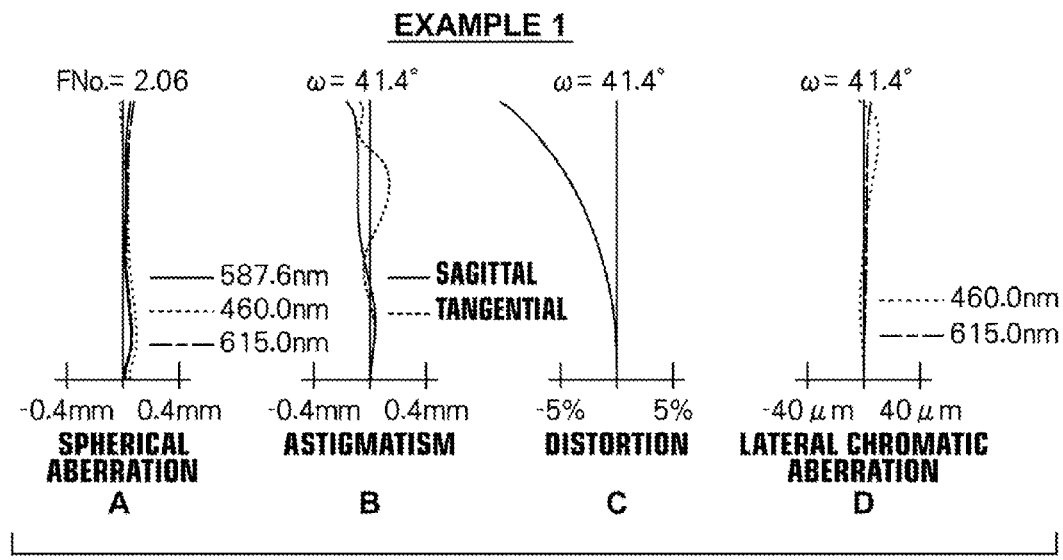

A through D of FIG. 9 are diagrams that illustrate aberrations of the imaging lens according to Example 1 of the present invention.

Figure 10:
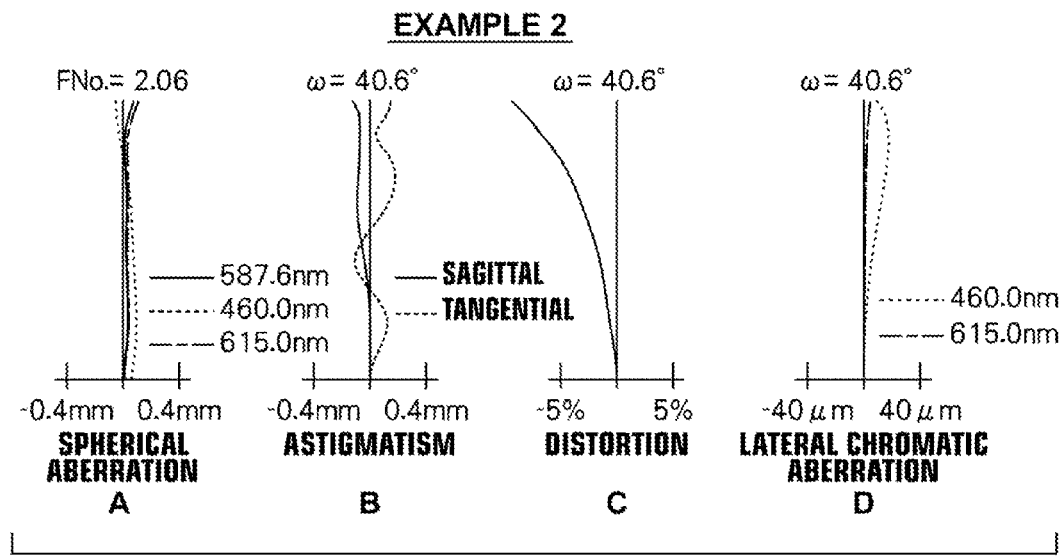

A through D of FIG. 10 are diagrams that illustrate aberrations of the imaging lens according to Example 2 of the present invention.

Figure 11:
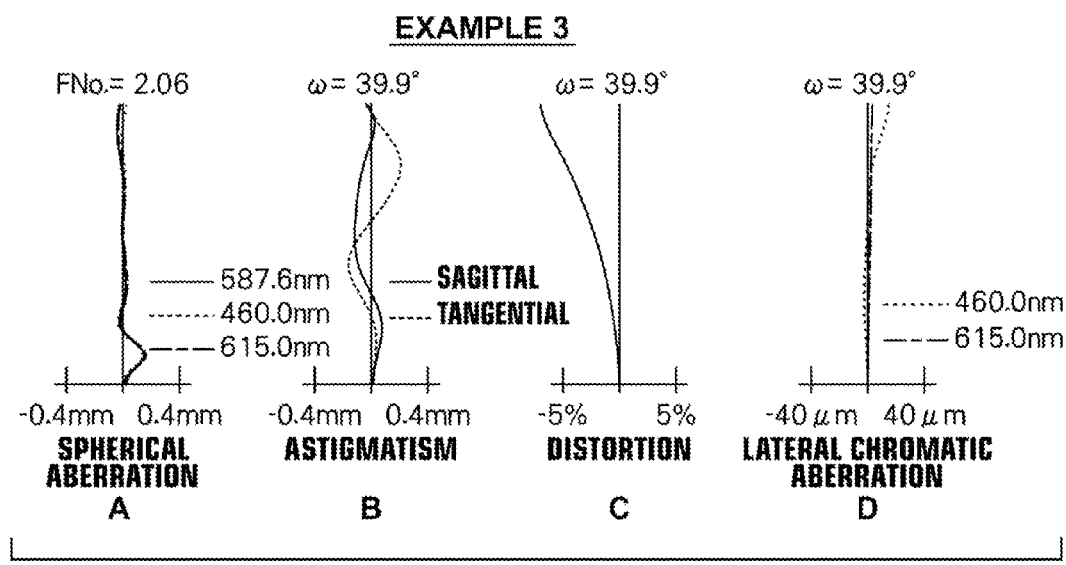

A through D of FIG. 11 are diagrams that illustrate aberrations of the imaging lens according to Example 3 of the present invention.

Figure 12:
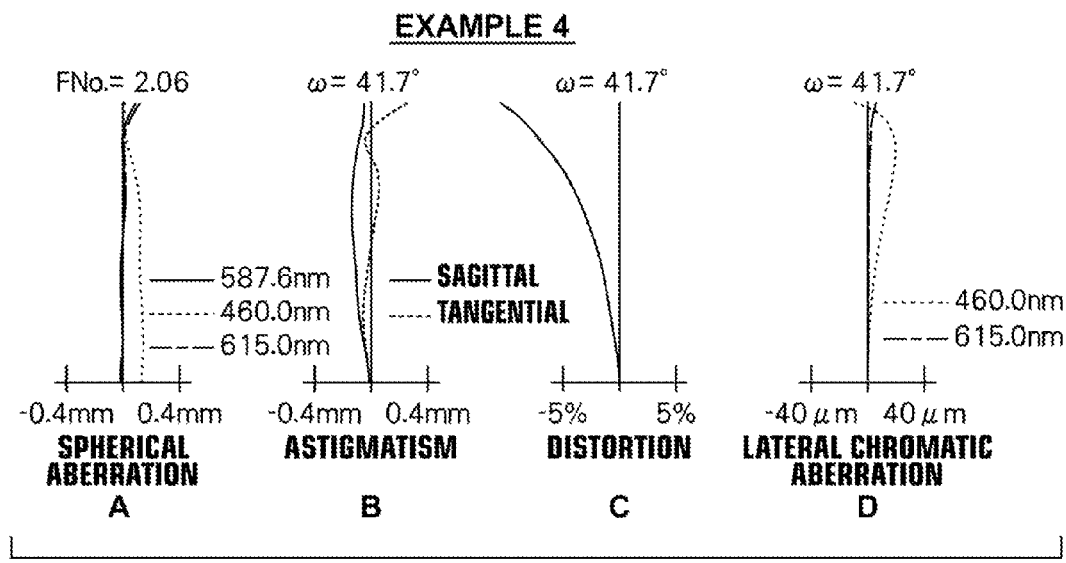

A through D of FIG. 12 are diagrams that illustrate aberrations of the imaging lens according to Example 4 of the present invention.

Figure 13:
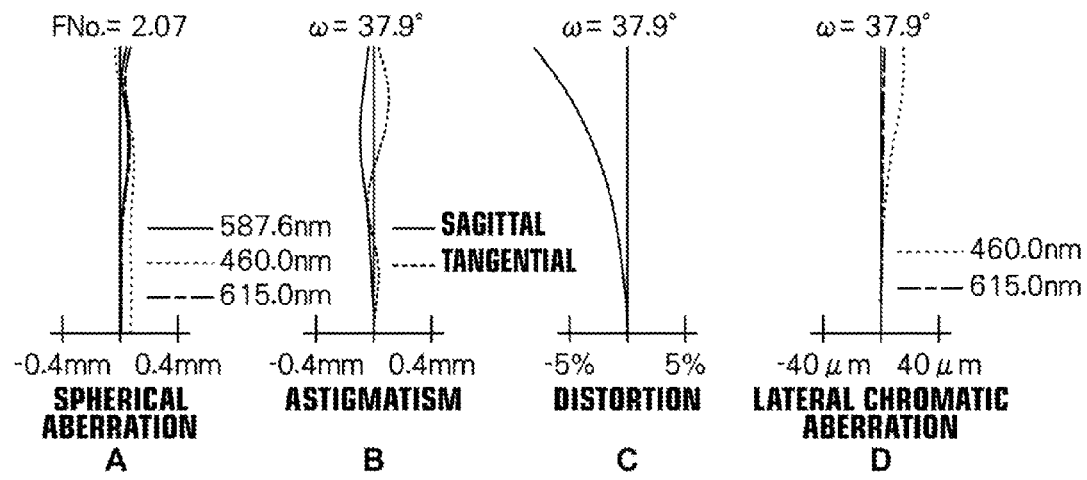

A through D of FIG. 13 are diagrams that illustrate aberrations of the imaging lens according to Example 5 of the present invention.

Figure 14:
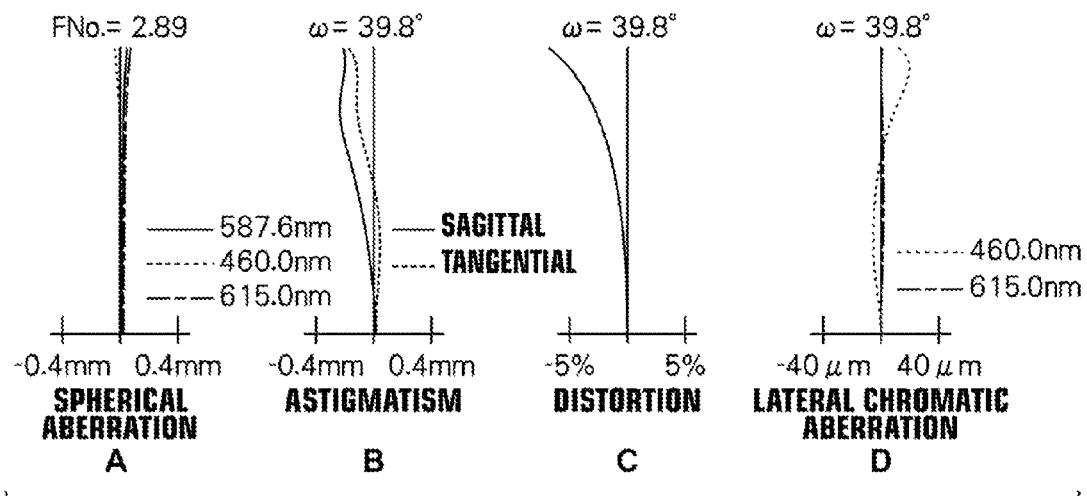

A through D of FIG. 14 are diagrams that illustrate aberrations of the imaging lens according to Reference Example 6 with respect to the present invention.

Figure 15:
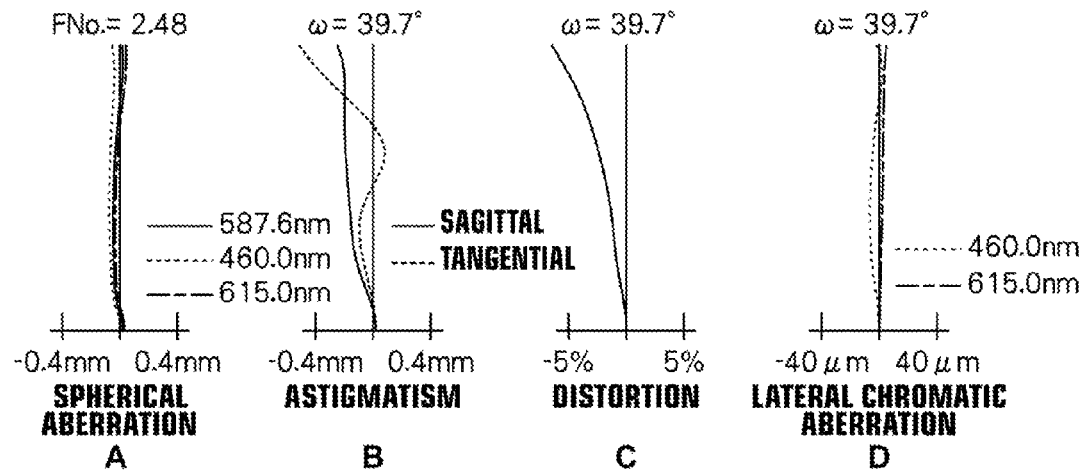

A through D of FIG. 15 are diagrams that illustrate aberrations of the imaging lens according to Reference Example 7 with respect to the present invention.

Figure 16:
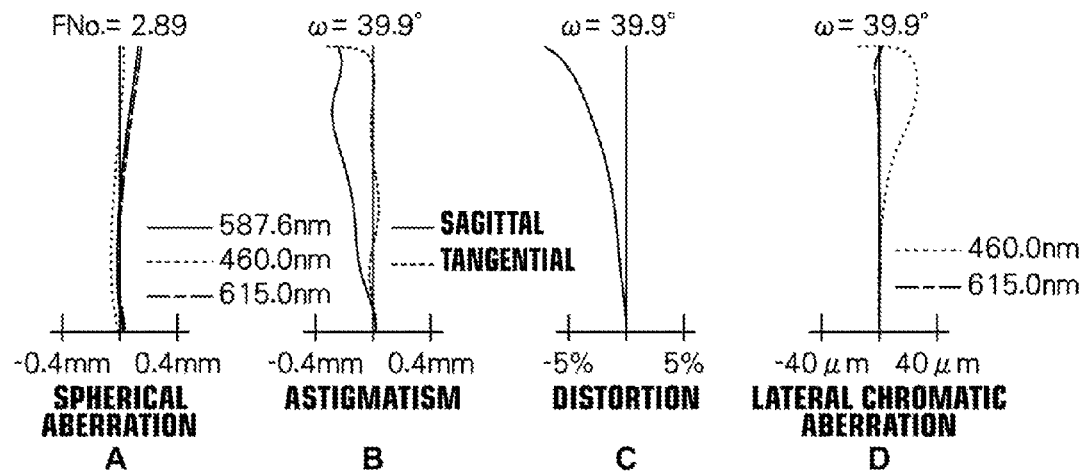

A through D of FIG. 16 are diagrams that illustrate aberrations of the imaging lens according to Reference Example 8 with respect to the present invention.

Figure 17:
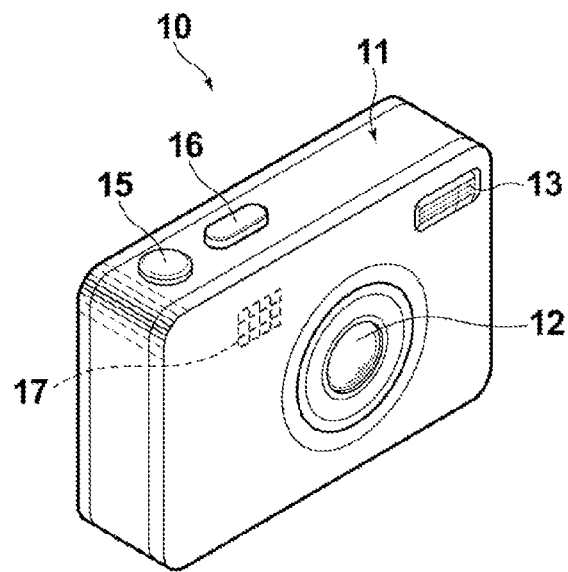

FIG. 17 is a diagram that schematically illustrates the configuration of an imaging apparatus according to an embodiment of the present invention.

Figure 18A:
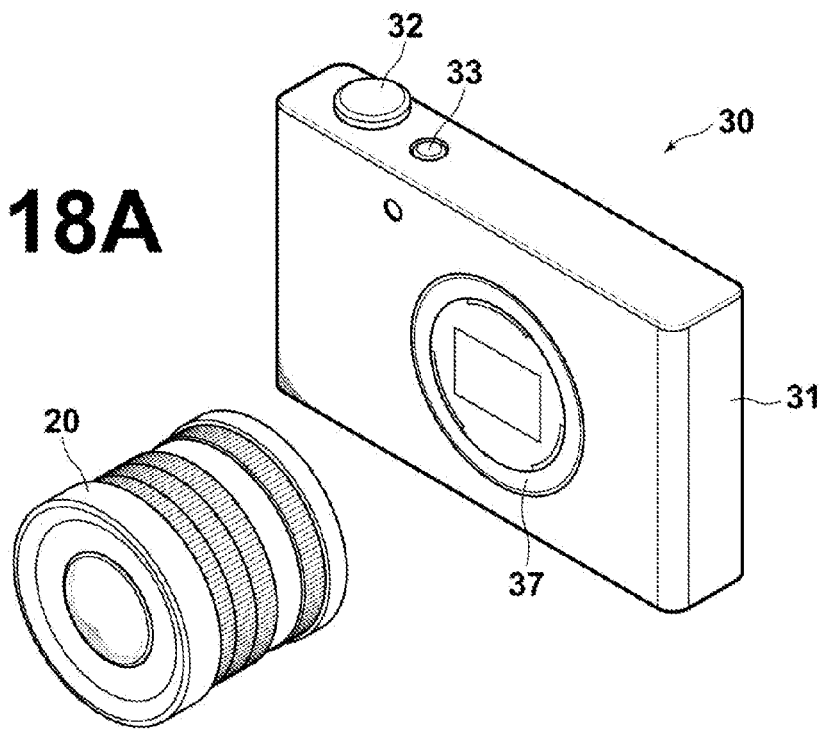

FIG. 18A is a schematic front view that illustrates an imaging apparatus according to another embodiment of the present invention.

Figure 18B:
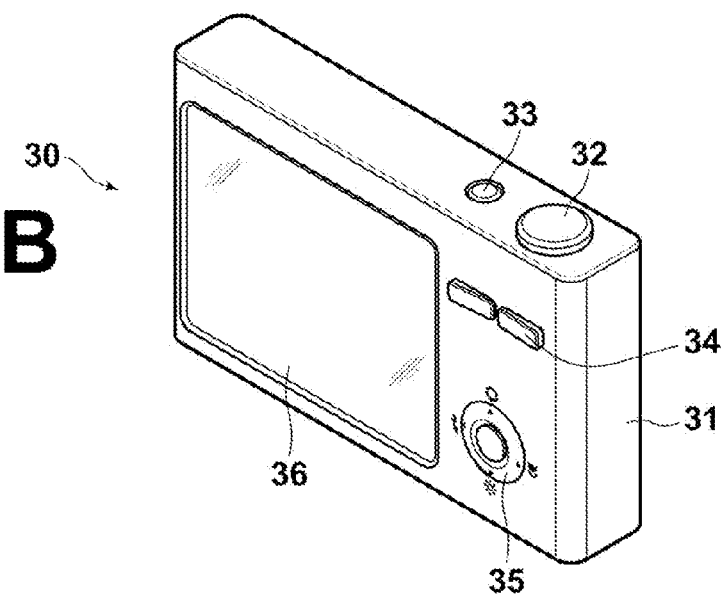

FIG. 18B is a schematic rear view of the imaging apparatus illustrated in FIG. 18A.

BEST MODE FOR CARRYING OUT THE INVENTION

Figure 1:
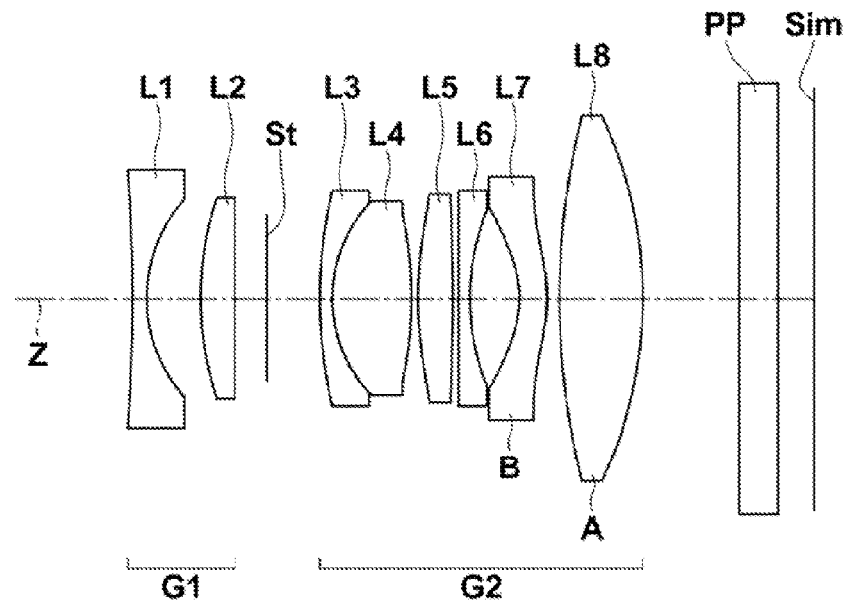
FIG. 1 is a sectional diagram that illustrates the lens configuration of an imaging lens according to Example 1 of the present invention.

Hereinafter, embodiments of the present invention will be described in detail with reference to the attached drawings. FIG. 1 is a cross sectional diagram that illustrates the configuration of a imaging lens according to an embodiment of the present invention, and corresponds to a imaging lens of Example 1 to be described later. FIG. 2 through FIG. 5 are cross sectional diagrams that illustrate configurations of imaging lenses according to other embodiments of the present invention, and correspond to imaging lenses of Examples 2 through 5 to be described later. Similarly, FIGS. 6 through 8 are cross sectional diagrams that illustrate the configurations of reference examples with respect to the present invention, and correspond to imaging lenses of Reference Examples 6 through 8 to be described later. The basic configurations of the embodiments illustrated in FIG. 1 through FIG. 8 are the same except for points that will be mentioned later. The manners in which the configurations are illustrated are also the same. Therefore, the imaging lenses according to the embodiments of the present invention will be described mainly with reference to FIG. 1.

In FIG. 1, the left side is the object side and the right side is the image side. FIG. 1 illustrates the arrangement of the optical system in a state focused on infinity. The same applies to FIGS. 2 through 8 to be described later.

The imaging lens of the present embodiment is constituted by: a first lens group G1having a negative or a positive refractive power; and a second lens group G2having a positive refractive power, provided in this order from the object side as lens groups. Note that an aperture stop St is provided between the first lens group G1and the second lens group G2.

The first lens group G1 of the present embodiment is constituted by a first lens L1, which is a negative lens (a lens having a negative refractive power), and a second lens L2, which is a positive lens (a lens having a positive refractive power), provided in this order from the object side.

Meanwhile, the second lens group G2 is constituted by a third lens L3, which is a negative lens, a fourth lens L4, which is a positive lens cemented to the third lens L3, a fifth lens L5, which is a positive lens, a sixth lens L6, which is a negative lens, a seventh lens L7, which is also a negative lens, and an eighth lens L8, which is a positive lens, provided in this order from the object side.

Note that the aperture stop St illustrated in FIG. 1 does not necessarily represent the size or shape thereof, but only the position thereof on an optical axis Z. In addition, Sim illustrated in FIG. 1 is an imaging surface, and an imaging device, such as a CCD (Charge Coupled Device) and a CMOS (Complementary Metal Oxide Semiconductor), is provided at the imaging surface, as will be described later.

In addition, FIG. 1 illustrates an example in which a parallel plate optical member PP is provided between the second lens group G2 and the imaging surface Sim. When the imaging lens is applied to an imaging apparatus, a cover glass and various filter, such as an infrared ray cutoff filter and a low pass filter, are often provided between the optical system and the imaging surface Sim, according to the configuration of an imaging apparatus on which the lens is to be mounted. The optical member PP is provided assuming the presence of the cover glass, the various types of filters, and the like. In addition, recent imaging apparatuses employ the 3 CCD format, in which CCD's are employed for each color in order to improve image quality. In order to be compatible with the 3 CCD format, a color separating optical system such as a color separating prism may be inserted between the lens system and the imaging surface Sim. In this case, a color separating optical system may be provided as the optical member PP.

In the imaging lens of the present embodiment, focusing is performed by moving the entirety of the optical system along the optical axis Z.

Hereinafter, details of the lenses that constitute each of the lens groups will be described. As an example, the first lens is a biconcave lens, the second lens L2 is a planoconvex lens having a convex surface toward the object side (the left side in FIG. 1), the third lens L3 is a negative meniscus lens having a concave surface toward the image side (that is, the side of the imaging surface Sim toward the right side in FIG. 1), the fourth lens L4 is a biconvex lens, the fifth lens L5 is a biconvex lens, the sixth lens L6 is a planoconcave lens having a concave surface toward the image side, the seventh lens L7 is a negative meniscus lens having a concave surface toward the object side, and the eighth lens L8 is a biconvex lens. Note that as will be shown in Table 1 to be described later, the fifth lens L5 and the seventh lens L7 have aspherical surfaces both toward the object side and the image side.

As described above, the imaging lens of the present embodiment is of a configuration in which the first lens L1, which is a negative lens, is provided most toward the object side within the first lens group G2. The imaging lens of the present embodiment can achieve a wide angle of view, by a negative lens being provided most toward the object side.

In addition, the second lens group G2 of the imaging lens of the present embodiment is provided with the eighth lens L8 (lens A of the present invention) having a positive refractive power and provided most toward the side of the imaging surface, and the seventh lens L7 (lens B of the present invention) having a negative refractive power, a aspherical surface at least toward the object side, and a concave surface toward the object side. The imaging lens of the present embodiment can correct spherical aberration and field curvature with favorable balance, and further can achieve sufficient miniaturization, by the seventh lens L7, which is an aspherical lens having a negative refractive power, within the second lens group G2.

In addition, the imaging lens of the present embodiment satisfies both of the following conditional formulae:

$$0.03 < (|Sagsp1| - |Sagas1|)/Re1 < 0.35 \quad (1)$$

$$1.819 \le NdAB \quad (2)$$

wherein Sagsp1 is the amount of sag of a reference spherical surface (a spherical surface to which the radius of curvature on the optical axis is applied) at the edge of the effective diameter of the surface of the seventh lens L7 toward the object side, Sagas1 is the amount of sag of the aspherical surface, Re1 is the effective diameter of the lens surface toward the object side, and NdAB is the average refractive index of the seventh lens L7 and the eighth lens L8. Further, the imaging lens of the present embodiment satisfies the following conditional formula within the range defined in Conditional Formula (1):

$$0.04 < (|Sagsp1| - |Sagas1|)/Re1 < 0.32 \quad (1').$$

Note that the conditions defined by Conditional Formulae (1) and (2), that is the specific values of the equations therein, are collectively shown for each Example and for each of the aforementioned Reference Examples in Table 17. This also applies to Conditional Formula (3) through (7) to be described later.

The imaging lens of the present embodiment exhibits the following advantageous effects, by satisfying both of Conditional Formulae (1) and (2). That is, Conditional Formula (1) defines the relationship between the difference between the amount of sag of the aspherical surface toward the object side of the seventh lens L7 and the amount of sag of a reference spherical surface, and the effective radius of the seventh lens L7. If the value of $(|Sagsp1| - |Sagas1|)/Re1$ is outside the range defined in Conditional Formula (1), aberrations such as spherical aberration, field curvature, and lateral chromatic aberration cannot be corrected with favorable balance, which is not preferable. The above shortcoming can be prevented if Conditional Formula (1) is satisfied, and various aberrations can be favorably corrected.

The imaging lens of the present embodiment satisfies Conditional Formula (1') within the range defined in Conditional Formula (1), and therefore, the aforementioned advantageous effect is exhibited more prominently.

Meanwhile, Conditional Formula (2) defines the average value of the refractive indices of the eight lens L8 and the seventh lens L7. If the value of NdAB is less than the lower limit defined in Conditional Formula (2), control of the Petzval sum will become difficult, resulting in correction of field curvature becoming difficult, which is not preferable. The above shortcoming can be prevented if Conditional Formula (2) is satisfied, and it will be possible to favorably correct field curvature.

In addition, in the imaging lens of the present embodiment, the seventh lens L7 provided within the second lens group is of a meniscus shape having a concave surface toward the object side. Therefore, the occurrence of distortion and comatic aberration can be reduced.

In addition, the imaging lens of the present embodiment satisfies the following conditional formula:

$$0.06 < (|Sagsp2| - |Sagas2|)/Re2 < 0.30 \quad (3)$$

wherein the surface of the seventh lens L7 toward the image side is aspherical, Sagsp2 is the amount of sag of a reference spherical surface at the edge of the effective diameter of the surface of the seventh lens L7 toward the image side, Sagas2 is the amount of sag of the aspherical surface of the seventh lens L7, and Re2 is the effective diameter of the lens surface of the seventh lens L7 toward the image side. Further, the imaging lens of the present embodiment satisfies the following conditional formula within the range defined in Conditional formula (3) (refer to Table 17):

$$0.09 < (|Sagsp2| - |Sagas2|)/Re2 < 0.28 \quad (3').$$

Therefore, the imaging lens of the present embodiment exhibits the following advantageous effect. That is, Conditional Formula (3) defines the relationship between the difference between the amount of sag of the aspherical surface toward the image side of the seventh lens L7 and the amount of sag of a reference spherical surface, and the effective radius of the seventh lens L7. If the value of $(|Sagsp2| - |Sagas2|)/Re2$ is outside the range defined in Conditional Formula (3), aberrations such as spherical aberration, field curvature, and lateral chromatic aberration cannot be corrected with favorable balance, which is not preferable. The above shortcoming can be prevented if Conditional Formula (3) is satisfied, and various aberrations can be favorably corrected.

The imaging lens of the present embodiment satisfies Conditional Formula (3') within the range defined in Conditional Formula (3), and therefore, the aforementioned advantageous effect is exhibited more prominently.

In the imaging lens of the present embodiment, a cemented lens formed by the third lens L3 and the fourth lens L4 cemented together is provided more toward the object side than the seventh lens L7. Therefore, longitudinal chromatic aberration and lateral chromatic aberration can be corrected with favorable balance, even in the case that the diameters of the lenses are increased or the angle of view is widened in the imaging lens of the present embodiment.

In the imaging lens of the present embodiment, the fifth lens L5 having a positive refractive power and at least one aspherical surface (both surfaces in the present example) is provided more toward the object side than the seventh lens L7. Therefore, spherical aberration can be favorably corrected.

In the imaging lens of the present embodiment, the second lens group G2 is constituted by the cemented lens formed by the third lens L3 and the fourth lens L4 cemented together, the fifth lens L5, which is a positive lens, the sixth lens L6, which is a negative lens, the seventh lens L7 as the lens B, and the eighth lens L8 as the lens A, provided in this order from the object side. By adopting this configuration, it becomes possible to correct various aberrations with favorable balance from the optical axis through the peripheral portions of the lenses.

The imaging lens of the present embodiment satisfies the following conditional formula:

$$0.8 < fA/f < 1.7 \qquad (4)$$

wherein fA is the focal length of the eighth lens L8 as the lens A, and f is the focal length of the entire lens system. Further, the imaging lens of the present embodiment satisfies the following conditional formula within the range defined in Conditional Formula (4):

$$0.9 < fA/f < 1.6 \qquad (4')\text{ (refer to Table 17)}.$$

Thereby, the imaging lens of the present embodiment exhibits the following advantageous effects. That is, Conditional Formula (4) defines the relationship between the focal length of the eighth lens L8 and the focal length of the entire system. If the value of fA/f is greater than the upper limit defined in Conditional Formula (4), comatic aberration may increase, and further, the exit pupil position will become more toward the imaging surface, resulting in a loss of telecentric properties, which is not preferable. Inversely, if the value of fA/f is less than the lower limit defined in Conditional Formula (4), correction of field curvature will become difficult, which is not preferable. The above shortcomings can be prevented if Conditional Formula (4) is satisfies. That is, the occurrence of comatic aberration can be suppressed, telecentric properties can be secured, and further, favorable correction of field curvature will become possible.

The imaging lens of the present embodiment satisfies Conditional Formula (4') within the range defined in Conditional Formula (4), and therefore, the aforementioned advantageous effects are exhibited more prominently.

The imaging lens of the present embodiment satisfies the following conditional formula:

$$0.6 < |fB|/f < 3.4 \qquad (5)$$

wherein fB is the focal length of the seventh lens L7 as the lens B, and f is the focal length of the entire lens system. Further, the imaging lens of the present embodiment satisfies the conditional formula below within the range defined in Conditional Formula (5):

$$0.7 < |fB|/f < 3.3 \qquad (5').$$

Thereby, the imaging lens of the present embodiment exhibits the following advantageous effects. That is, Conditional Formula (5) defines the relationship between the focal length of the seventh lens L7 and the focal length of the entire system. If the value of |fB|/f is less than the lower limit defined in Conditional Formula (5) and the power of the seventh lens L7 becomes excessively strong, correction of off axis aberrations which are generated in the second lens group will become difficult, which is not preferable. Inversely, if the value of |fB|/f is greater than the upper limit defined in Conditional Formula (5), it will become difficult to maintain the balance between spherical aberration and field curvature while suppressing distortion, which is not preferable. The above shortcomings can be prevented if Conditional Formula (5) is satisfied. That is, off axis aberrations can be favorably corrected, and the balance between spherical aberration and field curvature can be maintained while suppressing distortion.

The imaging lens of the present embodiment satisfies Conditional Formula (5') within the range defined in Conditional Formula (5), and therefore, the aforementioned advantageous effects are exhibited more prominently.

The imaging lens of the present embodiment satisfies the following conditional formula:

$$2.2 < TL/Y < 4.0 \qquad (6)$$

wherein TL is the distance along an optical axis from the lens surface most toward the object side within the first lens group G2, that is, the surface of the first lens L1 toward the object side, to the imaging surface Sim (back focus is an air converted length), and Y is a maximum image height, when focused on an object at infinity. Further, the imaging lens of the present embodiment satisfies the conditional formula below within the range defined in Conditional Formula (6) (refer to Table 17):

$$2.3 < TL/Y < 3.8 \qquad (6').$$

Thereby, the imaging lens of the present embodiment exhibits the following advantageous effects. That is, Conditional Formula (6) defines the relationship between the total length of the optical system and the maximum image height. If the value of TL/Y is greater than the upper limit defined in Conditional Formula (6) it will be advantageous from the viewpoint of correcting aberrations. However, the size of the lens system as a whole will become large, which is not preferable from the viewpoint of miniaturization. Inversely, if the value of TL/Y is less than the lower limit defined in Conditional Formula (6), correction of spherical aberration and field curvature will become difficult in the lens system as a whole, which is not preferable. The above shortcomings can be prevented if Conditional Formula (6) is satisfied. That is, various aberrations can be favorably corrected, and miniaturization becomes possible.

The imaging lens of the present embodiment satisfies Conditional Formula (6') within the range defined in Conditional Formula (6), and therefore, the aforementioned advantageous effects are exhibited more prominently.

In addition, the imaging lens of the present embodiment satisfies the following conditional formula:

$$1.1 < TL/\Sigma d < 1.7 \qquad (7)$$

wherein $\Sigma d$ is the distance along the optical axis from the surface toward the object side of the first lens L1 to the lens surface toward the image side of the eighth lens L8, and TL is the distance along an optical axis from the lens surface toward the object side of the first lens L1 to the imaging surface Sim, when focused on an object at infinity. Further, the imaging lens of the present embodiment satisfies the conditional formula below within the range defined in Conditional Formula (7) (refer to Table 17):

$$1.2 < TL/\Sigma d < 1.6 \qquad (7').$$

Thereby, the imaging lens of the present embodiment exhibits the following advantageous effects. That is, Conditional Formula (7) defines the relationship between the distance along the optical axis from the lens surface most toward the object side within the first lens group G1 to the lens surface most toward the image side in the second lens group G2 and the distance along the optical axis from the lens surface most toward the object side within the first lens group G1 to the imaging surface. If the value of TL/Σd is greater than the upper limit defined in Conditional Formula (7), the lens system as a whole becomes large, and realizing both miniaturization and high performance will become difficult. Inversely, if the value of TL/Σd is less than the lower limit defined in Conditional Formula (7), it will become difficult to correct spherical aberration and field curvature in a balanced manner, and further, it will become difficult to secure a necessary amount of back focus. The above shortcomings can be prevented if Conditional Formula (7) is satisfied. That is, both miniaturization and high performance can be realized, spherical aberration and field curvature can be corrected in a balanced manner, and securing a desired amount of back focus will be facilitated.

The imaging lens of the present embodiment satisfies Conditional Formula (7') within the range defined in Conditional Formula (7), and therefore, the aforementioned advantageous effects are exhibited more prominently.

Next, Examples of the imaging lens of the present invention, and particularly examples of numerical values, will be described in detail.

EXAMPLE 1

As described previously, the arrangement of the lens groups within the imaging lens of Example 1 is illustrated in FIG. 1. Note that the details of the lens groups and each lens in the configuration of FIG. 1 have been described previously. Therefore, redundant descriptions will be omitted below, unless particularly necessary.

Table 1 shows basic lens data of the imaging lens of Example 1. Table 1 also shows data regarding the optical member PP. In Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, and the distances between an ith surface and an i+1st surface along the optical axis Z are shown in the column Di. The refractive indices of jth (j=1, 2, 3, . . . ) optical elements from the object side to the image side with respect to the d line (wavelength: 587.6 nm), j being a number that increases sequentially with the optical element most toward the object side designated as first, are shown in the column Ndj. The Abbe's numbers of the jth optical elements with respect to the d line are shown in the column vdj. Note that the aperture stop St is also included in the basic lens data, and the radius of curvature of the surface corresponding to the aperture stop St is shown as "∞" (aperture stop).

The units of the radii of curvature R and the distances D between adjacent lens surfaces are mm. Table 1 shows numerical values which are rounded to a predetermined number of digits. The signs of the radii of curvature are positive in cases that the surface shape is convex toward the object side, and negative in cases that the surface shape is convex toward the image side.

In the lens data of Table 1, surface numbers of aspherical surfaces are denoted with the mark "*", and numerical values that represent paraxial radii of curvature are shown as the radii of curvature of the aspherical surfaces. The focal length f and the F number of the entire lens system are indicated beneath Table 1.

The foregoing applies to Tables 3, 5, 9, 11, 13, and 15 to be described later.

Table 2 shows aspherical surface data of the imaging lens of Example 1. In the numerical values of the aspherical surface coefficients of Table 2, "E-n (n: integer)" means "·10$^{-n}$". Note that the aspherical surface coefficients are the values of the coefficients KA and Am (m=3, 4, 5, . . . , 16) in the aspherical surface formula below.

$$Zd = C \cdot h^2 / \{1 + (1 - KA \cdot C^2 \cdot h^2)^{1/2}\} + \Sigma Am \cdot h^m$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Am are aspherical surface coefficients (m=3, 4, 5, . . . , 16). The manner in which items are shown in Table 2 described above also apply to Tables 4, 6, 8, 10, 12, 14, and 16 to be described later.

In all of the tables below, mm is used as the units for lengths and degrees (°) are used as units of angles. However, it is possible for optical systems to be proportionately enlarged or proportionately reduced and utilized. Therefore, other appropriate units may be used.

TABLE 1

Example 1: Basic Lens Data

| Si (Surface Number) | Ri (Radius of Curvature) | Di (Distance) | Ndj (Refractive Index) | vdj (Abbe's Number) |
|---|---|---|---|---|
| 1 | −127.7261 | 1.00 | 1.517417 | 52.43 |
| 2 | 10.3754 | 3.75 | | |
| 3 | 22.3303 | 2.40 | 1.834000 | 37.16 |
| 4 | ∞ | 2.51 | | |
| 5 | ∞ (Aperture Stop) | 3.70 | | |
| 6 | 33.4959 | 0.86 | 1.647689 | 33.79 |
| 7 | 9.7960 | 5.50 | 1.804000 | 46.57 |
| 8 | −27.8872 | 0.47 | | |
| *9 | 29.2500 | 2.40 | 1.806100 | 40.73 |
| *10 | −130.8460 | 0.40 | | |
| 11 | ∞ | 0.80 | 1.922860 | 18.90 |
| 12 | 16.6589 | 2.51 | | |
| *13 | −7.2118 | 1.90 | 1.805004 | 40.98 |
| *14 | −12.0000 | 0.87 | | |
| 15 | 52.4207 | 5.80 | 1.834807 | 42.71 |
| 16 | −29.8692 | 6.71 | | |
| 17 | ∞ | 2.70 | 1.516330 | 64.14 |
| 18 | ∞ | | | |

*Aspherical Surface
f = 18.554
F No. = 2.06

TABLE 2

Example 1: Aspherical Surface Data

| | Aspherical Surface Coefficient: S9 | | Aspherical Surface Coefficient: S10 |
|---|---|---|---|
| KA | 4.78304655 | KA | −1497.83281901 |
| A3 | −2.53595966E−05 | A3 | 3.99685295E−04 |
| A4 | 5.91514146E−05 | A4 | −2.61954183E−04 |
| A5 | −4.93656786E−05 | A5 | 8.54474233E−06 |
| A6 | 4.75153450E−06 | A6 | 1.35531333E−05 |
| A7 | 7.34091959E−07 | A7 | −1.33495869E−06 |
| A8 | 2.19092014E−07 | A8 | −7.65249439E−08 |

TABLE 2-continued

Example 1: Aspherical Surface Data

| A9  | −1.01933177E−07 | A9  | −2.67058977E−08 |
|-----|-----------------|-----|-----------------|
| A10 | 4.87556962E−09  | A10 | 7.34713251E−09  |
| A11 | 6.30048753E−10  | A11 | 2.29305258E−10  |
| A12 | 9.55609385E−11  | A12 | −4.25150935E−11 |
| A13 | −5.32097670E−12 | A13 | −2.16472161E−12 |
| A14 | −6.34524093E−12 | A14 | −4.08200802E−12 |
| A15 | 7.81178659E−13  | A15 | 4.73756578E−13  |
| A16 | −1.86432156E−14 | A16 | 4.03970404E−15  |

| Aspherical Surface Coefficient: S13 | | Aspherical Surface Coefficient: S14 | |
|-----|-----------------|-----|-----------------|
| KA  | −9.99999182     | KA  | −9.03456826     |
| A3  | 1.44873607E−03  | A3  | 6.08341085E−04  |
| A4  | −4.57007497E−03 | A4  | −5.87639667E−04 |
| A5  | 1.22220936E−03  | A5  | 1.76418852E−04  |
| A6  | −8.81849829E−05 | A6  | −7.54073400E−06 |
| A7  | −3.13466545E−06 | A7  | −1.38246135E−06 |
| A8  | −8.63636316E−07 | A8  | 2.08740129E−07  |
| A9  | 3.14898636E−07  | A9  | 4.01946484E−08  |
| A10 | −1.63434945E−08 | A10 | −2.05178639E−08 |
| A11 | −8.44979403E−10 | A11 | 2.61661033E−09  |
| A12 | 2.11519332E−11  | A12 | −1.08213936E−10 |

Table 17 shows the values of Examples 1 through 5 and Reference Examples 6 through 8 corresponding to Conditional Formulae (1) through (7), that is, the equation portions of the conditional formulae. The values shown in Table 17 are related to the d line. As shown in Table 19, the imaging lens of Example 1 and the imaging lenses of Examples 2 through 5 to be described later satisfy all of Conditional Formulae (1) through (7), and further satisfy Conditional Formulae (1') and (3') through (7') that define more preferable ranges within Conditional Formulae (1) through (7). The advantageous effects obtained by satisfying these conditional formulae are those which were previously described in detail.

The spherical aberration, the astigmatic aberration, the distortion, and the lateral chromatic aberration of the imaging lens of Example 1 when focused on infinity are illustrated in A through D of FIG. 9, respectively. Each of the diagrams that illustrate the aberrations use the d line (wavelength: 587.6 nm) as a standard. However, aberrations related to wavelengths of 460.0 nm and 615.0 nm are also shown in the diagrams that illustrate spherical aberration. Particularly, aberrations related to wavelengths of 460.0 nm and 615.0 nm are shown in the diagrams that illustrate lateral chromatic aberration. In the diagrams that illustrate astigmatic aberrations, aberrations in the sagittal direction are indicated by solid lines, while aberrations in the tangential direction are indicated by broken lines. In the diagram that illustrates spherical aberration, "Fno." denotes F values. In the other diagrams that illustrate the aberrations, ω denotes half angles of view. The manners in which the aberrations are displayed described above also apply to FIG. 10 through FIG. 16, to be described later.

As illustrated in FIG. 9, the full angle of view (2ω) of the imaging lens of the present embodiment is 82.8°, which is a sufficiently wide angle of view. In addition, the imaging lenses of Examples 2 through 5 and Reference Examples 6 through 8 have full angles of view (2ω) within a range from 75.8° to 83.4° as illustrated in FIG. 10 through FIG. 16, and sufficiently wide angles of view are achieved.

EXAMPLE 2

Figure 2:
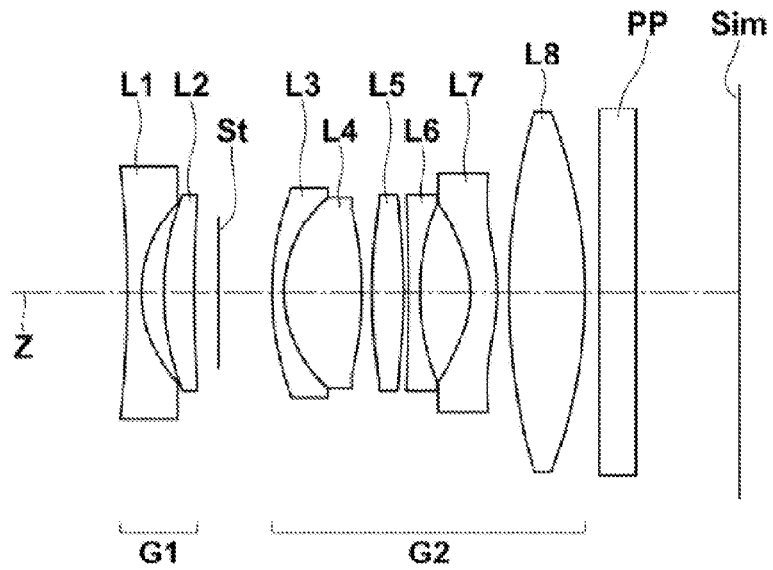
FIG. 2 is a sectional diagram that illustrates the lens configuration of an imaging lens according to Example 2 of the present invention.

FIG. 2 illustrates the arrangement of lens groups in the imaging lens of Example 2. The imaging lens of Example 2 is of approximately the same configuration as the imaging lens of Example 1 described above. However, the imaging lens of Example 2 differs from the imaging lens of Example 1 in the two points that a second lens L2 is a positive meniscus lens having a convex surface toward the object side, and that a sixth lens L6 is a biconcave lens.

Table 3 shows basic lens data of the imaging lens of Example 2. Table 4 shows aspherical surface data of the imaging lens of Example 2. A through D of FIG. 10 are diagrams that illustrate various aberrations of the imaging lens of Example 2.

TABLE 3

Example 2: Basic Lens Data

| Si (Surface Number) | Ri (Radius of Curvature) | Di (Distance) | Ndj (Refractive Index) | νdj (Abbe's Number) |
|-----|-----------|------|----------|-------|
| 1   | −80.0000  | 1.00 | 1.517417 | 52.43 |
| 2   | 9.2689    | 1.60 |          |       |
| 3   | 19.2129   | 2.15 | 1.834000 | 37.16 |
| 4   | 101.3295  | 1.72 |          |       |
| 5   | ∞ (Aperture Stop) | 3.80 |   |       |
| 6   | 20.7970   | 0.86 | 1.647689 | 33.79 |
| 7   | 9.0025    | 5.50 | 1.804000 | 46.57 |
| 8   | −25.5044  | 0.70 |          |       |
| *9  | 39.1945   | 2.20 | 1.803480 | 40.45 |
| *10 | −37.6732  | 0.33 |          |       |
| 11  | −150.0000 | 0.80 | 1.922860 | 18.90 |
| 12  | 17.2345   | 7.33 |          |       |
| *13 | −6.6807   | 1.90 | 1.803480 | 40.45 |
| *14 | −12.0000  | 0.82 |          |       |
| 15  | 45.9635   | 5.40 | 1.834807 | 42.71 |
| 16  | −35.0136  | 1.00 |          |       |
| 17  | ∞         | 2.62 | 1.516798 | 64.20 |
| 18  | ∞         |      |          |       |

*Aspherical Surface
f = 18.854
F No. = 2.06

TABLE 4

Example 2: Aspherical Surface Data

| Aspherical Surface Coefficients: S9 | | Aspherical Surface Coefficients: S10 | |
|-----|-----------------|-----|-----------------|
| KA  | 9.94562146      | KA  | −3.86617713     |
| A3  | −3.99325184E−04 | A3  | 3.05524212E−04  |
| A4  | 1.65432376E−04  | A4  | −3.91221660E−05 |
| A5  | −5.39737384E−05 | A5  | −5.23283422E−05 |
| A6  | −1.29448361E−06 | A6  | 1.59399579E−05  |
| A7  | 1.06609095E−06  | A7  | 1.52032292E−08  |
| A8  | 3.70834302E−07  | A8  | −1.13603555E−08 |
| A9  | −9.00794016E−08 | A9  | −6.63052605E−08 |
| A10 | 3.13216208E−09  | A10 | 6.68408817E−09  |
| A11 | 9.26676924E−11  | A11 | 2.63155603E−10  |
| A12 | 8.32277233E−11  | A12 | 1.23304215E−10  |
| A13 | −8.47241325E−13 | A13 | −5.56915714E−12 |
| A14 | −6.43662026E−12 | A14 | −5.98418845E−12 |
| A15 | 1.14389760E−12  | A15 | 2.26714112E−13  |
| A16 | −6.13643054E−14 | A16 | 3.93404391E−14  |

| Aspherical Surface Coefficients: S13 | | Aspherical Surface Coefficients: S14 | |
|-----|-----------------|-----|-----------------|
| KA  | −5.39593592     | KA  | −4.87393068     |
| A3  | 4.57487144E−03  | A3  | 1.79360822E−03  |
| A4  | −4.97882264E−03 | A4  | −6.64556493E−04 |
| A5  | 1.27085374E−03  | A5  | 2.27642623E−04  |
| A6  | −9.53161143E−05 | A6  | −1.00695911E−05 |
| A7  | −5.28482873E−06 | A7  | −2.58708134E−06 |
| A8  | −4.68978838E−07 | A8  | 1.68785610E−07  |
| A9  | 3.46214722E−07  | A9  | 5.80705968E−08  |

TABLE 4-continued

Example 2: Aspherical Surface Data

| A10 | −1.32070409E−08 | A10 | −1.43753403E−08 |
| A11 | −3.37929860E−09 | A11 | 1.36763101E−09 |
| A12 | 1.99081683E−10 | A12 | −4.79911948E−11 |

EXAMPLE 3

FIG. 3 illustrates the arrangement of lens groups in the imaging lens of Example 3. The imaging lens of Example 3 has approximately the same configuration as the imaging lens of Example 1 described above. However, the imaging lens of Example 3 differs from the imaging lens of Example 1 in the three points that a second lens L2 is a positive meniscus lens having a convex surface toward the object side, that a sixth lens L6 is a biconcave lens, and that a fifth lens L5 and the sixth lens L6 are cemented together.

In the present example, the second lens group G2 is constituted by a cemented lens formed by a third lens L3 and a fourth lens L4, a cemented lens formed by the fifth lens L5 and the sixth lens L6, a seventh lens L7 as the lens B, and an eighth lens L8 as the lens A, provided in this order from the object side. The configuration of the imaging lens of the present example, in which two pairs of cemented lenses are provided in the manner described above, is advantageous from the viewpoint of correcting chromatic aberrations.

Table 5 shows basic lens data of the imaging lens of Example 3. Table 6 shows aspherical surface data of the imaging lens of Example 3. A through D of FIG. 11 are diagrams that illustrate various aberrations of the imaging lens of Example 3.

TABLE 5

Example 3: Basic Lens Data

| Si (Surface Number) | Ri (Radius of Curvature) | Di (Distance) | Ndj (Refractive Index) | νdj (Abbe's Number) |
|---|---|---|---|---|
| 1 | −113.6099 | 0.80 | 1.516330 | 64.14 |
| 2 | 11.5347 | 2.47 | | |
| *3 | 17.8575 | 2.00 | 1.690980 | 52.97 |
| *4 | 33.3311 | 2.20 | | |
| 5 | ∞ (Aperture Stop) | 2.12 | | |
| 6 | 19.3073 | 0.81 | 1.520010 | 51.25 |
| 7 | 14.4557 | 4.50 | 1.834000 | 37.16 |
| 8 | −38.5549 | 0.32 | | |
| 9 | 22.7596 | 5.04 | 1.834807 | 42.71 |
| 10 | −11.0578 | 0.80 | 1.874674 | 21.27 |
| 11 | 17.5448 | 6.27 | | |
| *12 | −6.5002 | 1.59 | 1.803480 | 40.45 |
| *13 | −10.3081 | 0.20 | | |
| 14 | 65.1621 | 5.30 | 1.903658 | 31.32 |
| 15 | −28.0576 | 1.00 | | |
| 16 | ∞ | 2.70 | 1.516798 | 64.20 |
| 17 | ∞ | | | |

*Aspherical Surface
f = 18.863
F No. = 2.06

TABLE 6

Example 3: Aspherical Surface Data

| | Aspherical Surface Coefficients: S3 | | Aspherical Surface Coefficients: S4 |
|---|---|---|---|
| KA | 1.20646345 | KA | 0.88819810 |
| A3 | −1.50450747E−03 | A3 | 4.94780389E−04 |

TABLE 6-continued

Example 3: Aspherical Surface Data

| A4 | 3.90499317E−03 | A4 | −1.91989240E−03 |
| A5 | −4.93337039E−03 | A5 | 2.13850474E−03 |
| A6 | 3.27821689E−03 | A6 | −1.37573633E−03 |
| A7 | −1.32673685E−03 | A7 | 5.32160214E−04 |
| A8 | 3.40533459E−04 | A8 | −1.31511982E−04 |
| A9 | −5.58339331E−05 | A9 | 2.09484696E−05 |
| A10 | 5.67135271E−06 | A10 | −2.08513873E−06 |
| A11 | −3.25570305E−07 | A11 | 1.17865536E−07 |
| A12 | 8.08781617E−09 | A12 | −2.87736397E−09 |

| | Aspherical Surface Coefficients: S12 | | Aspherical Surface Coefficients: S13 |
|---|---|---|---|
| KA | 0.31372602 | KA | 1.37420959 |
| A3 | −4.35891599E−03 | A3 | −2.83765591E−06 |
| A4 | 1.51694459E−02 | A4 | 1.46859023E−03 |
| A5 | −1.84436030E−02 | A5 | −9.56706325E−04 |
| A6 | 1.23062218E−02 | A6 | 3.96271067E−04 |
| A7 | −5.00076759E−03 | A7 | −6.95566614E−05 |
| A8 | 1.29913396E−03 | A8 | −3.59907015E−07 |
| A9 | −2.17460257E−04 | A9 | 2.25222137E−06 |
| A10 | 2.27348227E−05 | A10 | −3.83102106E−07 |
| A11 | −1.35270775E−06 | A11 | 2.76222423E−08 |
| A12 | 3.50218210E−08 | A12 | −7.56047272E−10 |

EXAMPLE 4

FIG. 4 illustrates the arrangement of lens groups in the imaging lens of Example 4. The imaging lens of Example 4 is of approximately the same configuration as the imaging lens of Example 1 described above. However, the imaging lens of Example 4 differs from the imaging lens of Example 1 in the two points that a second lens L2 is a positive meniscus lens having a convex surface toward the object side, and that a sixth lens L6 is a biconcave lens.

Table 7 shows basic lens data of the imaging lens of Example 4. Table 8 shows aspherical surface data of the imaging lens of Example 4. A through D of FIG. 12 are diagrams that illustrate various aberrations of the imaging lens of Example 4.

TABLE 7

Example 4: Basic Lens Data

| Si (Surface Number) | Ri (Radius of Curvature) | Di (Distance) | Ndj (Refractive Index) | νdj (Abbe's Number) |
|---|---|---|---|---|
| 1 | −130.0000 | 1.00 | 1.517417 | 52.43 |
| 2 | 8.9033 | 2.20 | | |
| 3 | 20.1515 | 2.20 | 1.834000 | 37.16 |
| 4 | 296.1613 | 1.50 | | |
| 5 | ∞ (Aperture Stop) | 3.00 | | |
| 6 | 24.7340 | 0.86 | 1.647689 | 33.79 |
| 7 | 9.0025 | 5.00 | 1.804000 | 46.57 |
| 8 | −24.1575 | 0.36 | | |
| *9 | 57.6598 | 2.21 | 1.803480 | 40.45 |
| *10 | −33.1452 | 0.43 | | |
| 11 | −147.1837 | 0.80 | 1.922860 | 18.90 |
| 12 | 15.9115 | 2.40 | | |
| *13 | −7.2122 | 1.70 | 1.803480 | 40.45 |
| *14 | −12.0000 | 0.86 | | |
| 15 | 52.1174 | 5.30 | 1.834807 | 42.71 |
| 16 | −30.0118 | 7.80 | | |
| 17 | ∞ | 2.70 | 1.516330 | 64.14 |
| 18 | ∞ | | | |

*Aspherical Surface
f = 18.844
F No. = 2.06

TABLE 8

Example 4: Aspherical Surface Data

| | Aspherical Surface Coefficients: S9 | | Aspherical Surface Coefficients: S10 |
|---|---|---|---|
| KA | 4.81697393 | KA | −25.25812231 |
| A3 | −2.87083732E−04 | A3 | 1.18906335E−04 |
| A4 | 1.05711740E−04 | A4 | −1.88109111E−04 |
| A5 | −6.53027730E−05 | A5 | −2.34215137E−05 |
| A6 | 6.68165534E−06 | A6 | 1.52087805E−05 |
| A7 | 8.53227276E−07 | A7 | −1.00378688E−06 |
| A8 | 2.32786056E−07 | A8 | −4.03960798E−08 |
| A9 | −1.14759171E−07 | A9 | −3.86232149E−08 |
| A10 | 5.33961887E−09 | A10 | 7.75211108E−09 |
| A11 | 7.55941020E−10 | A11 | 3.22968768E−10 |
| A12 | 1.48424669E−10 | A12 | 6.57664659E−12 |
| A13 | −1.42751835E−12 | A13 | −5.75922797E−13 |
| A14 | −7.22317200E−12 | A14 | −4.21518210E−12 |
| A15 | 3.05071684E−13 | A15 | −5.22006545E−14 |
| A16 | 3.44249052E−14 | A16 | 5.69869593E−14 |

| | Aspherical Surface Coefficients: S13 | | Aspherical Surface Coefficients: S14 |
|---|---|---|---|
| KA | −9.89517991 | KA | −9.85793120 |
| A3 | 1.85057692E−03 | A3 | 5.21756700E−04 |
| A4 | −4.82506210E−03 | A4 | −6.33880498E−04 |
| A5 | 1.27004228E−03 | A5 | 1.83688280E−04 |
| A6 | −9.11546904E−05 | A6 | −5.27618751E−06 |
| A7 | −3.89232232E−06 | A7 | −1.61504338E−06 |
| A8 | −8.50728357E−07 | A8 | 1.55286768E−07 |
| A9 | 3.21279636E−07 | A9 | 4.00169628E−08 |
| A10 | −1.41686834E−08 | A10 | −1.95650895E−08 |
| A11 | −9.17275261E−10 | A11 | 2.66391220E−09 |
| A12 | −2.40950739E−11 | A12 | −1.17572834E−10 |

EXAMPLE 5

FIG. 5 illustrates the arrangement of lens groups in the imaging lens of Example 5. The imaging lens of Example 5 is of approximately the same configuration as the imaging lens of Example 1 described above. However, the imaging lens of Example 5 differs from the imaging lens of Example 1 in the two points that a second lens L2 is a positive meniscus lens having a convex surface toward the object side, and that a sixth lens L6 is a biconcave lens.

Table 9 shows basic lens data of the imaging lens of Example 5. Table 10 shows aspherical surface data of the imaging lens of Example 5. A through D of FIG. 13 are diagrams that illustrate various aberrations of the imaging lens of Example 5.

TABLE 9

Example 5: Basic Lens Data

| Si (Surface Number) | Bi (Radius of Curvature) | Di (Distance) | Ndj (Refractive Index) | vdj (Abbe's Number) |
|---|---|---|---|---|
| 1 | −130.0000 | 1.00 | 1.517417 | 52.43 |
| 2 | 10.8674 | 5.00 | | |
| 3 | 22.7371 | 2.80 | 1.834000 | 37.16 |
| 4 | 452.3189 | 1.60 | | |
| 5 | ∞ (Aperture Stop) | 3.66 | | |
| 6 | 25.8065 | 0.86 | 1.647689 | 33.79 |
| 7 | 9.8729 | 5.50 | 1.804000 | 46.57 |
| 8 | −33.2513 | 0.46 | | |
| *9 | 50.1808 | 2.45 | 1.803480 | 40.45 |
| *10 | −44.1144 | 0.33 | | |
| 11 | −148.4884 | 0.88 | 1.922860 | 18.90 |
| 12 | 17.1721 | 2.42 | | |
| *13 | −7.3040 | 1.70 | 1.803480 | 40.45 |

TABLE 9-continued

Example 5: Basic Lens Data

| Si (Surface Number) | Bi (Radius of Curvature) | Di (Distance) | Ndj (Refractive Index) | vdj (Abbe's Number) |
|---|---|---|---|---|
| *14 | −12.0000 | 0.98 | | |
| 15 | 54.5458 | 5.30 | 1.834807 | 42.71 |
| 16 | −30.9086 | 7.80 | | |
| 17 | ∞ | 2.70 | 1.516330 | 64.14 |
| 18 | ∞ | | | |

*Aspherical Surface
f = 18.856
F No. = 2.07

TABLE 10

Example 5: Aspherical Surface Data

| | Aspherical Surface Coefficients: S9 | | Aspherical Surface Coefficients: S10 |
|---|---|---|---|
| KA | 4.90090515 | KA | −25.22281915 |
| A3 | −1.84709305E−04 | A3 | 2.99627545E−04 |
| A4 | 1.05821251E−04 | A4 | −1.31941782E−04 |
| A5 | −6.65469018E−05 | A5 | −2.09834253E−05 |
| A6 | 6.61172613E−06 | A6 | 1.46865320E−05 |
| A7 | 8.36108156E−07 | A7 | −1.14208296E−06 |
| A8 | 2.25209237E−07 | A8 | −6.09820829E−08 |
| A9 | −1.16356900E−07 | A9 | −4.06604740E−08 |
| A10 | 5.06290063E−09 | A10 | 7.50824758E−09 |
| A11 | 7.31359358E−10 | A11 | 2.94183901E−10 |
| A12 | 1.48166446E−10 | A12 | 1.67466824E−12 |
| A13 | −9.70862393E−13 | A13 | −1.16466908E−12 |
| A14 | −7.23507634E−12 | A14 | −4.11154058E−12 |
| A15 | 2.89320207E−13 | A15 | −1.49318959E−14 |
| A16 | 4.00127676E−14 | A16 | 5.77182293E−14 |

| | Aspherical Surface Coefficients: S13 | | Aspherical Surface Coefficients: S14 |
|---|---|---|---|
| KA | −9.88382213 | KA | −9.88458283 |
| A3 | 2.56858244E−03 | A3 | 1.00726329E−03 |
| A4 | −4.72632229E−03 | A4 | −6.22310432E−04 |
| A5 | 1.27113397E−03 | A5 | 1.83108224E−04 |
| A6 | −9.17998235E−05 | A6 | −5.65132488E−06 |
| A7 | −3.99843732E−06 | A7 | −1.66903373E−06 |
| A8 | −8.59190196E−07 | A8 | 1.50757121E−07 |
| A9 | 3.20600103E−07 | A9 | 3.98900514E−08 |
| A10 | −1.42365085E−08 | A10 | −1.95881277E−08 |
| A11 | −9.13420969E−10 | A11 | 2.66925840E−09 |
| A12 | −1.58382351E−11 | A12 | −1.16589812E−10 |

REFERENCE EXAMPLE 6

FIG. 6 illustrates the arrangement of lens groups in the imaging lens of Reference Example 6, which is a reference with respect to the present invention. The basic lens configuration of the imaging lens of Reference Example 6 differs from that of the imaging lens of Example 1 in that the fifth lens L5 illustrated in FIG. 1 is omitted. Further, the imaging lens of Reference Example 6 differs from the imaging lens of Example 1 in the three points that a first lens L1 is a negative meniscus lens having a concave surface toward the image side, that a second lens L2 is a biconvex lens, and that a lens L6 (which is the fifth lens in the arrangement of lenses of the present example) is a biconcave lens.

In the present reference example, the second lens group G2 is constituted by a cemented lens formed by a third lens L3 and a fourth lens L4, the sixth lens L6, which is a negative lens, a lens L7 as the lens B (which is the sixth lens in the arrangement of lenses of the present example), and a lens L8 as the lens A (which is the seventh lens in the arrangement of lenses of the present example), provided in this order from the object side. The configuration of the imaging lens of the present reference example, in which the number of lenses is fewer than that of the imaging lens of Example 1, for example, is advantageous from the viewpoint of miniaturization. Note that the arrangement of lenses and the advantageous effect obtained thereby are the same for Reference Example 7 to be described next.

Table 11 shows basic lens data of the imaging lens of Reference Example 6. Table 12 shows aspherical surface data of the imaging lens of Reference Example 6. A through D of FIG. 14 are diagrams that illustrate various aberrations of the imaging lens of Reference Example 6.

TABLE 11

Reference Example 6: Basic Lens Data

| Si (Surface Number) | Ri (Radius of Curvature) | Di (Distance) | Ndj (Refractive Index) | νdj (Abbe's Number) |
|---|---|---|---|---|
| 1 | 58.0833 | 1.00 | 1.516330 | 64.14 |
| 2 | 8.3912 | 4.23 | | |
| 3 | 10.9529 | 2.30 | 1.834807 | 42.71 |
| 4 | −6256.9901 | 1.20 | | |
| 5 | ∞ (Aperture Stop) | 2.81 | | |
| 6 | 88.3106 | 0.80 | 1.922860 | 20.88 |
| 7 | 9.2435 | 3.81 | 1.806098 | 40.92 |
| 8 | −11.5251 | 0.60 | | |
| 9 | −7.8613 | 0.80 | 1.517417 | 52.43 |
| 10 | 1218.6224 | 7.77 | | |
| *11 | −10.0717 | 2.50 | 1.803480 | 40.45 |
| *12 | −14.2198 | 1.86 | | |
| 13 | 32.9353 | 6.10 | 1.712995 | 53.87 |
| 14 | −50.4045 | 1.00 | | |
| 15 | ∞ | 2.70 | 1.516798 | 64.20 |
| 16 | ∞ | | | |

*Aspherical Surface
f = 18.868
F No. = 2.89

TABLE 12

Reference Example 6: Aspherical Surface Data

| Aspherical Surface Coefficients: S11 | | Aspherical Surface Coefficients: S12 | |
|---|---|---|---|
| KA | −5.12553605 | KA | −1.63733654 |
| A3 | −1.22702854E−04 | A3 | −1.49673929E−04 |
| A4 | −2.33137590E−04 | A4 | 3.45219272E−04 |
| A5 | 4.99574202E−05 | A5 | 2.10696817E−06 |
| A6 | 3.39986645E−06 | A6 | 5.59019982E−07 |
| A7 | −3.19281503E−07 | A7 | 4.12161905E−08 |
| A8 | −1.01985382E−07 | A8 | −8.54586014E−09 |
| A9 | −1.26952530E−08 | A9 | −3.03447087E−09 |
| A10 | 7.04464703E−10 | A10 | −4.77897563E−10 |
| A11 | −1.14347078E−10 | A11 | −3.25983052E−11 |
| A12 | 6.51197694E−12 | A12 | 1.10297759E−11 |

REFERENCE EXAMPLE 7

FIG. 7 illustrates the arrangement of lens groups in the imaging lens of Reference Example 7, which is a reference with respect to the present invention. The basic lens configuration of the imaging lens of Reference Example 7 differs from that of the imaging lens of Example 1 in that the fifth lens L5 illustrated in FIG. 1 is omitted. Further, the imaging lens of Reference Example 7 differs from the imaging lens of Example 1 in the three points that a first lens L1 is a negative meniscus lens having a concave surface toward the image side, that a second lens L2 is a positive meniscus lens having a convex surface toward the object side, and that a lens L6 (which is the fifth lens in the arrangement of lenses of the present example) is a negative meniscus lens having a concave surface toward the image side.

Table 13 shows basic lens data of the imaging lens of Reference Example 7. Table 14 shows aspherical surface data of the imaging lens of Reference Example 7. A through D of FIG. 15 are diagrams that illustrate various aberrations of the imaging lens of Reference Example 7.

TABLE 13

Reference Example 7: Basic Lens Data

| Si (Surface Number) | Ri (Radius of Curvature) | Di (Distance) | Ndj (Refractive Index) | νdj (Abbe's Number) |
|---|---|---|---|---|
| 1 | 212.8612 | 0.80 | 1.516330 | 64.14 |
| 2 | 8.2668 | 2.00 | | |
| 3 | 17.3362 | 2.10 | 1.882997 | 40.76 |
| 4 | 144.2976 | 1.80 | | |
| 5 | ∞ (Aperture Stop) | 2.68 | | |
| 6 | 27.2346 | 1.07 | 1.717362 | 29.52 |
| 7 | 7.7826 | 4.50 | 1.834807 | 42.73 |
| 8 | −19.6219 | 1.01 | | |
| 9 | 33.6879 | 1.42 | 1.945945 | 17.98 |
| 10 | 15.0136 | 7.65 | | |
| *11 | −6.5002 | 2.10 | 1.803480 | 40.45 |
| *12 | −9.7174 | 1.21 | | |
| 13 | 53.9552 | 6.14 | 1.754999 | 52.32 |
| 14 | −29.3506 | 1.00 | | |
| 15 | ∞ | 2.70 | 1.516798 | 64.20 |
| 16 | ∞ | | | |

*Aspherical Surface
f = 18.869
F No. = 2.48

TABLE 14

Reference Example 7: Aspherical Surface Data

| Aspherical Surface Coefficients: S11 | | Aspherical Surface Coefficients: S12 | |
|---|---|---|---|
| KA | −2.38572878 | KA | −1.86113087 |
| A3 | −1.25859616E−03 | A3 | −1.51462894E−03 |
| A4 | −8.09714364E−04 | A4 | 5.15006852E−04 |
| A5 | 8.48700504E−05 | A5 | −7.95503754E−05 |
| A6 | −6.50397812E−06 | A6 | 1.77670229E−07 |
| A7 | −1.78410618E−06 | A7 | 1.03634564E−06 |
| A8 | −4.41056751E−08 | A8 | 1.09130422E−07 |
| A9 | 1.49748658E−07 | A9 | −8.69447389E−09 |
| A10 | −3.86899509E−09 | A10 | −2.99128482E−09 |
| A11 | −2.78766509E−09 | A11 | 1.00938813E−10 |
| A12 | 3.67327812E−12 | A12 | 1.70943256E−11 |

REFERENCE EXAMPLE 8

FIG. 8 illustrates the arrangement of lens groups in the imaging lens group of Reference Example 8, which is a reference with respect to the present invention. The basic lens configuration of the imaging lens of Reference Example 8 differs from that of the imaging lens of Example 1 in that the fifth lens L5 and the sixth lens L6 illustrated in FIG. 1 are omitted. Further, the imaging lens of Reference Example 8 differs from the imaging lens of Example 1 in the three points that a first lens L1 is a negative meniscus lens having a concave surface toward the image side, that a second lens L2 is positive meniscus lens having a convex surface toward the object side, and that a third lens L3 is a biconcave lens.

In the present reference example, the second lens group G2 is constituted by a cemented lens formed by the third lens L3 and a fourth lens L4, a lens L7 as the lens B (which is the fifth lens in the arrangement of lenses of the present example), and a lens L8 as the lens A (which is the sixth lens in the arrangement of lenses of the present example), provided in this order from the object side. The configuration of the imaging lens of the present reference example, in which the number of lenses is fewer than that of the imaging lens of Example 1, for example, and further fewer than those of the imaging lenses of Reference Example 6 and Reference Example 7, is even more advantageous from the viewpoint of miniaturization.

Table 15 shows basic lens data of the imaging lens of Reference Example 8. Table 16 shows aspherical surface data of the imaging lens of Reference Example 8. A through D of FIG. 16 are diagrams that illustrate various aberrations of the imaging lens of Reference Example 8.

TABLE 16

Reference Example 8: Aspherical Surface Data

| | Aspherical Surface Coefficients: S9 | | Aspherical Surface Coefficients: S10 |
|---|---|---|---|
| KA | −1.50873953 | KA | −4.44074910 |
| A3 | −6.53961478E−04 | A3 | −8.88208265E−04 |
| A4 | −4.25595920E−04 | A4 | 7.20669091E−04 |
| A5 | 8.17105996E−05 | A5 | −2.35323679E−05 |
| A6 | −8.31236773E−06 | A6 | −2.09995933E−06 |
| A7 | −3.49135750E−06 | A7 | −3.28890458E−08 |
| A8 | 6.43228049E−08 | A8 | −2.33998931E−09 |
| A9 | 3.91756042E−08 | A9 | −2.26148107E−09 |
| A10 | 2.78708327E−08 | A10 | −9.60856406E−10 |
| A11 | −8.83971988E−09 | A11 | 3.74563792E−10 |
| A12 | 4.45760531E−10 | A12 | −2.38659215E−11 |

TABLE 17

| | Example 1 | Example 2 | Example 3 | Example 4 | Example 5 | Reference Example 6 | Reference Example 7 | Reference Example 8 |
|---|---|---|---|---|---|---|---|---|
| Values Related to Conditional Formulae | | | | | | | | |
| (1) (|Sagsp1| − |Sagas1|)/Re1 | 0.220 | 0.280 | 0.181 | 0.173 | 0.177 | 0.064 | 0.086 | 0.118 |
| (2) NdAB | 1.820 | 1.819 | 1.854 | 1.819 | 1.819 | 1.758 | 1.779 | 1.788 |
| (3) (|Sagsp2| − |Sagas2|)/Re2 | 0.240 | 0.157 | 0.242 | 0.189 | 0.212 | 0.117 | 0.158 | 0.164 |
| (4) fA/f | 1.263 | 1.295 | 1.175 | 1.240 | 1.283 | 1.522 | 1.373 | 1.161 |
| (5) |fB|/f | 1.464 | 1.178 | 1.425 | 1.416 | 1.462 | 3.102 | 1.819 | 0.838 |
| (6) TL/γ | 3.174 | 2.897 | 2.874 | 2.840 | 3.538 | 2.720 | 2.801 | 2.519 |
| (7) TL/Σd | 1.309 | 1.337 | 1.273 | 1.392 | 1.335 | 1.360 | 1.340 | 1.462 |
| Reference Values | | | | | | | | |
| |Sagsp1| | 3.511 | 3.691 | 3.790 | 2.926 | 2.888 | 1.417 | 3.036 | 2.338 |
| |Sagas1| | 2.151 | 2.008 | 2.707 | 1.924 | 1.835 | 1.088 | 2.565 | 1.801 |
| Re1 | 6.190 | 6.021 | 6.000 | 5.800 | 5.938 | 5.152 | 5.500 | 4.552 |
| |Sagsp2| | 2.773 | 1.889 | 3.320 | 2.222 | 2.337 | 1.625 | 3.162 | 1.847 |
| |Sagas2| | 0.928 | 0.714 | 1.486 | 0.904 | 0.828 | 0.845 | 2.031 | 0.821 |
| Re2 | 7.672 | 7.463 | 7.578 | 6.956 | 7.115 | 6.665 | 7.173 | 6.267 |

TABLE 15

Reference Example 8: Basic Lens Data

| Si (Surface Number) | Ri (Radius of Curvature) | Di (Distance) | Ndj (Refractive Index) | vdj (Abbe's Number) |
|---|---|---|---|---|
| 1 | 49.9818 | 0.80 | 1.487490 | 70.23 |
| 2 | 8.3658 | 3.61 | | |
| 3 | 9.0559 | 2.50 | 1.785896 | 44.20 |
| 4 | 247.8970 | 9.41 | | |
| 5 | ∞ (Aperture Stop) | 2.22 | | |
| 6 | −32.9098 | 0.81 | 1.755199 | 27.51 |
| 7 | 6.3057 | 4.00 | 1.834807 | 42.71 |
| 8 | −21.1473 | 1.46 | | |
| *9 | −5.6000 | 2.00 | 1.803480 | 40.45 |
| *10 | −11.5561 | 0.77 | | |
| 11 | 46.3233 | 5.80 | 1.772499 | 49.60 |
| 12 | −25.3881 | 0.50 | | |
| 13 | ∞ | 2.70 | 1.516798 | 64.20 |
| 14 | ∞ | | | |

*Aspherical Surface
f = 18.883
F No. = 2.89

Note that FIG. 1 illustrates an example in which the optical member PP is provided between the lens system and the imaging surface Sim. Alternatively, various filters such as low pass filters and filters that cut off specific wavelength bands may be provided among each of the lenses. As a further alternative, coatings that have the same functions as the various filters may be administered on the surfaces of the lenses.

Next, an imaging apparatus according to the present invention will be described. FIG. 17 is a perspective view of a camera according to an embodiment of the present invention. The camera 10 of FIG. 17 is a compact digital camera provided with an imaging lens 12, which is a compact wide angle lens according to an embodiment of the present invention, at the front and interior of a camera body 11. A flash emitting device 13 for emitting flash onto subjects is provided on the front surface of the camera body 11. A shutter release button 15 and a power button 16 are provided on the upper surface of the camera body 11. An imaging device 17 is provided within the camera body 11. The imaging device 17 images optical images, which are formed by the compact wide angle lens 12, and converts the optical images to electrical signals. The imaging device is constituted by a CCD, a CMOS, or the like.

As described previously, the imaging lens 12 according to the embodiment of the present invention realizes sufficient miniaturization. Therefore, the camera 10 can be compact both while being carried and during photography, without adopting a retractable lens configuration. Alternatively, in the case that a retractable lens configuration is adopted, the camera 10 can be more compact and more portable than conventional cameras with retractable lenses. In addition, the camera 10 is capable of performing photography with high image quality and a wide angle of view, because the imaging lens 12 of the present invention is employed.

Next, an imaging apparatus according to another embodiment of the present invention will be described with reference to FIG. 18A and FIG. 18B. A camera 30 illustrated in the perspective views of FIG. 18A and FIG. 18B is a mirrorless single lens reflex digital still camera, onto which an exchangeable lens 20 is interchangeably mounted. FIG. 18A illustrates the outer appearance of the camera 30 as viewed from the front, and FIG. 18B illustrates the outer appearance of the camera 30 as viewed from the rear.

The camera 30 is equipped with a camera body 31. A shutter release button 32 and a power button 33 is provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37. The exchangeable lens 20 is an imaging lens according to the present invention housed within a lens barrel.

An imaging device (not shown), such as a CCD that receives images of subjects formed by the exchangeable lens 20 and outputs image signals corresponding to the images, a signal processing circuit that processes the image signals output by the imaging device to generate images, and a recording medium for recording the generated images, are provided within the camera body 31. In this camera 30, photography of a still image corresponding to a single frame is performed by pressing the shutter release button 32. Image data obtained by photography are recorded in the recording medium.

The mirrorless single lens reflex camera 30 is sufficiently compact in a state in which the exchangeable lens 20 is mounted thereon, and capable of photography with high image quality and a wide angle of view, because the imaging lens according to the present invention is employed as the exchangeable lens 20.

The present invention has been described with reference to the embodiments and Examples thereof. However, the present invention is not limited to the embodiments and Examples described above, and various modifications are possible. For example, the values of the radii of curvature of each lens component, the distances among surfaces, the refractive indices, the Abbe's numbers, the aspherical surface coefficients, etc., are not limited to the numerical values indicated in connection with the Examples, and may be other values.

What is claimed is:

1. An imaging lens, substantially consisting of:
a first lens group having a negative or a positive refractive power;
an aperture stop; and
a second lens group having a positive refractive power, provided in this order from an object side;
the first lens group at least including a negative lens provided most toward the object side;
the second lens group including a lens A having a positive refractive power, provided most toward the side of an imaging surface, and a lens B having a negative refractive power, an aspherical lens surface at least toward the object side, and a concave surface toward the object side, provided adjacent to and toward the object side of the lens A;
the imaging lens satisfying Conditional Formulae (1) and (2) below:

$$0.03<(|Sagsp1|-|Sagas1|)/Re1<0.35 \quad (1)$$

$$1.819 \leq NdAB \quad (2)$$

wherein Sagsp1 is the amount of sag of a reference spherical surface at the edge of the effective diameter of the surface of the lens B toward the object side, Sagas1 is the amount of sag of the aspherical surface of the lens B, Re1 is the effective diameter of the lens surface of the lens B toward the object side, and NdAB is the average refractive index of the lens A and the lens B.

2. An imaging lens as defined in claim 1 that satisfies Conditional Formula (1') below:

$$0.04<(|Sagsp1|-|Sagas1|)/Re1<0.32 \quad (1').$$

3. An imaging lens as defined in claim 1, wherein:
the lens B provided within the second lens group is of a meniscus shape having a concave surface toward the object side.

4. An imaging lens as defined in claim 1, wherein:
at least one pair of cemented lenses is provided more toward the object side than the lens B.

5. An imaging lens as defined in claim 1, wherein:
a lens having a positive refractive power and at least one aspherical surface is provided more toward the object side than the lens B.

6. An imaging lens as defined in claim 1, wherein:
the second lens group substantially consists of a cemented lens, a positive lens, a negative lens, the lens B, and the lens A, provided in this order from the object side.

7. An imaging lens as defined in claim 1, wherein:
the second lens group substantially consists of two pairs of cemented lenses, the lens B, and the lens A, provided in this order from the object side.

8. An imaging lens as defined in claim 1, wherein:
the second lens group substantially consists of a cemented lens, a negative lens, the lens B, and the lens A, provided in this order from the object side.

9. An imaging lens as defined in claim 1, wherein:
the second lens group substantially consists of a cemented lens, the lens B, and the lens A, provided in this order from the object side.

10. An imaging apparatus equipped with an imaging lens as defined in claim 1.

11. An imaging lens as defined in claim 1, wherein:
the lens surface toward an image side of the lens B provided in the second lens group is an aspherical surface; and
the imaging lens satisfies Conditional Formula (3) below:

$$0.06<(|Sagsp2|-|Sagas2|)/Re2<0.30 \quad (3)$$

wherein Sagsp2 is the amount of sag of a reference spherical surface at the edge of the effective diameter of the surface of the lens B toward the image side, Sagas2 is the amount of sag of the aspherical surface of the lens B, and Re2 is the effective diameter of the lens surface of the lens B toward the image side.

12. An imaging lens as defined in claim 11 that satisfies Conditional Formula (3') below:

$$0.09<(|Sagsp2|-|Sagas2|)/Re2<0.28 \quad (3').$$

13. An imaging lens as defined in claim 1 that satisfies Conditional Formula (4) below:

$$0.8 < fA/f < 1.7 \qquad (4)$$

wherein fA is the focal length of the lens A, and f is the focal length of the entire lens system.

14. An imaging lens as defined in claim 13 that satisfies Conditional Formula (4') below:

$$0.9 < fA/f < 1.6 \qquad (4').$$

15. An imaging lens as defined in claim 1 that satisfies Conditional Formula (5) below:

$$0.6 < |fB|/f < 3.4 \qquad (5)$$

wherein fB is the focal length of the lens B, and f is the focal length of the entire lens system.

16. An imaging lens as defined in claim 15 that satisfies Conditional Formula (5') below:

$$0.7 < |fB|/f < 3.3 \qquad (5').$$

17. An imaging lens as defined in claim 1 that satisfies Conditional Formula (6) below:

$$2.2 < TL/Y < 4.0 \qquad (6)$$

wherein TL is the distance along an optical axis from the lens surface most toward the object side within the first lens group to the imaging surface, and Y is a maximum image height, when focused on an object at infinity.

18. An imaging lens as defined in claim 17 that satisfies Conditional Formula (6') below:

$$2.3 < TL/Y < 3.8 \qquad (6').$$

19. An imaging lens as defined in claim 1 that satisfies Conditional Formula (7) below:

$$1.1 < TL/\Sigma d < 1.7 \qquad (7)$$

wherein $\Sigma d$ is the distance along the optical axis from the lens surface most toward the object side within the first lens group to the lens surface most toward the image side in the second lens group, and TL is the distance along an optical axis from the lens surface most toward the object side within the first lens group to the imaging surface, when focused on an object at infinity.

20. An imaging lens as defined in claim 19 that satisfies Conditional Formula (7') below:

$$1.2 < TL/\Sigma d < 1.6 \qquad (7').$$

* * * * *